(12) United States Patent
Shirato

(10) Patent No.: US 6,434,024 B2
(45) Date of Patent: Aug. 13, 2002

(54) POWER SUPPLY APPARATUS

(75) Inventor: Keiji Shirato, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/827,445

(22) Filed: Apr. 6, 2001

(30) Foreign Application Priority Data

Apr. 7, 2000 (JP) ........................................ 2000-107066
Dec. 26, 2000 (JP) ........................................ 2000-396178

(51) Int. Cl.[7] ............................................. H02M 3/335
(52) U.S. Cl. ................................................... 363/21.07
(58) Field of Search ......................... 363/16, 20, 21.01, 363/21.07, 21.15, 95, 97, 131

(56) References Cited

U.S. PATENT DOCUMENTS 5,414,611 A * 5/1995 Muto et al. ................... 363/20
5,675,485 A * 10/1997 Seong .......................... 363/97
5,862,044 A * 1/1999 Shioya et al. ................. 363/21
5,917,713 A * 6/1999 Higuchi ........................ 363/19
6,002,602 A * 12/1999 Higuchi ........................ 363/95

* cited by examiner

Primary Examiner—Matthew Nguyen
(74) Attorney, Agent, or Firm—Sonnenschein, Nath & Rosenthal

(57) ABSTRACT

A power supply apparatus is provided with a power supply transformer; excitation circuit portions provided at a primary side of the power supply transformer, for exciting the power supply transformer by means of a commercial power supply; and control circuit portions provided at a secondary side of the power supply transformer, for starting operation by the power supply transformer having entered an excited state and for intermittently operating the excitation circuit portion 50. Thereby, power in a waiting state can be suppressed at maximum and energy saving can be executed further efficiently.

11 Claims, 17 Drawing Sheets

POWER SUPPLY APPARATUS

RELATED APPLICATION DATA

The present application claims priority to Japanese Applications Nos. P2000-107066 filed Apr. 7, 2000, and P2000-396178 filed Dec. 26, 2000, which applications are incorporated herein by reference to the extent permitted by law.

BACKGROUND OF THE INVENTION

The present invention relates to a power supply apparatus, which is suitably applicable to a power supply apparatus to reduce consumed power, for example, when a television set is in a waiting state.

In a television set, when the main switch is switched to its "on" position after an AC plug is inserted into a commercial power supply, a commercial voltage is supplied from the AC plug to the main body which operates the television set's intrinsic functions. The main body inside the television set operates based on the commercial voltage supplied from the AC plug, and is arranged to execute various kinds of process such as displaying an image onto, for example, a cathode ray tube display (CRT) or the like.

In addition, in the television set, to provide for remote operations from a remote controller, a subswitch is arranged to supply the commercial voltage to the main body inside the television set. In this case, the television set can be made to remain in a waiting state until it receives light form control signals overlapped onto the infrared ray from the remote controller.

In its waiting state, the television set is supplied the waiting power supply portion as well as the main power supply switch with the commercial voltage supplied by inserting the AC plug into a commercial power supply. The waiting power supply portion draws down as well as converts the voltage level of the commercial voltage supplied from the AC plug into a direct current voltage and supplies this to the light-receiving portion.

In addition, the main power supply switch remains in an off-duty state until a control signal is supplied from the light-receiving portion, and does not supply the commercial voltage supplied from the AC plug to a main body inside the television set.

The light-receiving portion receives light of control signals carried by the infrared rays from the remote controller to extract the control signals by photoelectric conversion so as to output these to the main power supply switch.

This serves to operate the main power supply switch so that the commercial voltage is supplied to the main body. Accordingly, the television set switches from the waiting operation state to the state where the main power supply is involved.

Thus, when the television set is in a waiting operation state, only the waiting power supply portion is arranged to consume the electric power, and thereby the television set in its entirety is arranged to plan energy saving.

Incidentally, in the waiting power supply portion with such a configuration, currents are caused to flow intermittently toward the primary side of the power supply transformer provided in its interior so that the power supply transformer is excited intermittently, and draws down as well as converts the voltage level of the commercial voltage via the secondary side of the power supply transformer into a direct current voltage and supplies this to the light-receiving portion.

In this case, compared with the case where the power supply transformer is always excited, it is excited intermittently to lessen the consumed energy of the waiting power supply portion, resulting in the waiting power supply portion's consumed electric power being reduced, and this serves to make it possible to plan further energy saving for the television set in its entirety.

However, in a conventional waiting power supply portion, the main portion of the circuit for exiting the power supply transformer is provided on a primary side, and the current value inside the primary side will be increased so that it becomes necessary to make large the capacitor's capacitance to store the currents inside the primary side circuit. That is, the waiting power supply portion was still insufficient for energy saving.

In addition, the waiting power supply portion in this case has a capacitor's capacitance storing the currents to be supplied to the circuit at a primary side of the power supply transformer being large gives rise to a problem that a long time will be spent to store the currents into the capacitor.

SUMMARY OF THE INVENTION

In view of the foregoing an object of this invention is to provide a power supply apparatus which can save energy efficiently.

The foregoing object and other objects of the invention have been achieved by the provision of a power supply apparatus comprising: a power supply transformer; an excitation circuit, which is provided on a primary side of the power supply transformer to excite the power supply transformer with a predetermined alternating current power supply; and a control circuit, which is provided in a secondary side of the power supply transformer to start operation with the power supply transformer having entered an excited state and to intermittently operate the excitation circuit so as to make it possible to plan energy saving further efficiently.

The nature, principle and utility of the invention will become more apparent from the following detailed description when read in conjunction with the accompanying drawings in which like parts are designated by like reference numerals or characters.

DETAILED DESCRIPTION OF PREFERRED EMBODIMENTS

Preferred embodiments of this invention will be described with reference to the accompanying drawings:

(1) First Embodiment

Figure 1:
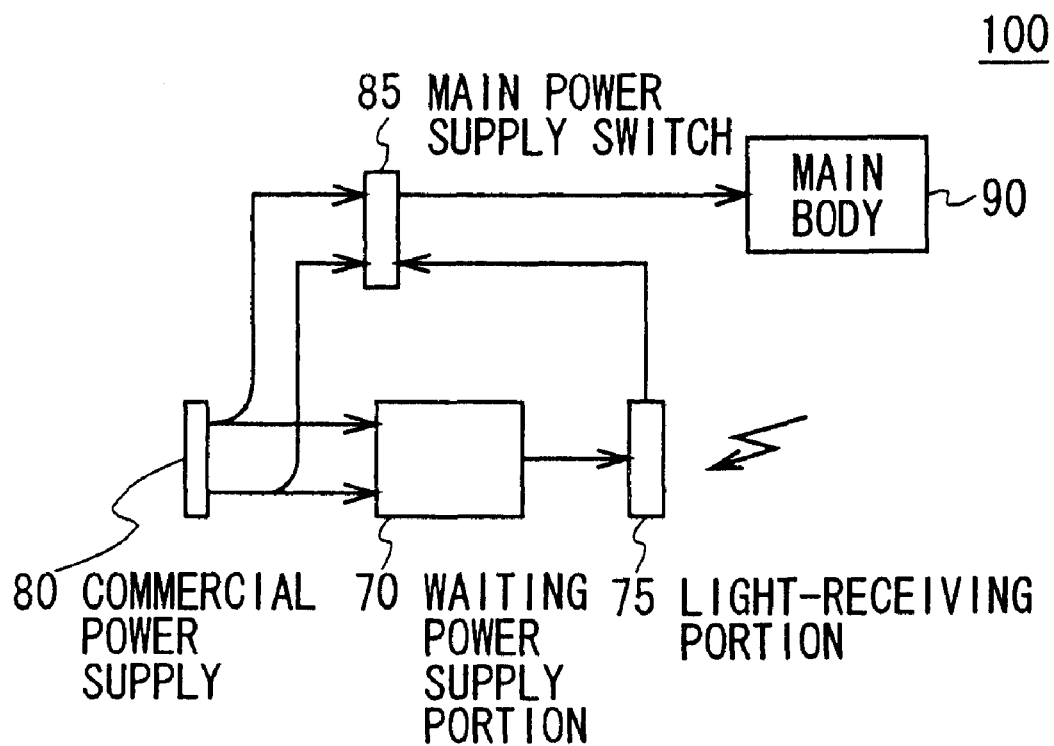
FIG. 1 is a block diagram showing a configuration of a television set.

In FIG. 1, reference numeral 100 denotes a television set, in which, when a user inserts an AC plug (not shown) of the television set 100 into a commercial power supply 80, the commercial voltage supplied from the commercial power supply 80 is supplied to a main power supply switch 85 as well as a waiting power supply portion 70 as the power supply apparatus.

The television set 100 will enter the waiting operation state in which the commercial voltage supplied from the commercial power supply 80 via the main power supply switch 85 is not output to the main body 90 during the period from insertion of the AC plug into the commercial power supply 80 to light-reception of the light-receiving portion 75 of the control signals expressing the start of the main body 90 from a (not shown) remote controller.

In addition, when the light-receiving portion 75 receives light with the control signal expressing starting of the main body 90, the television set 100 shifts from the waiting operation state to the state involving the operation of the main power supply so as to output the commercial voltage supplied to the main power supply switch 85 to the main body 90.

This serves to arrange the main body 90 to start based on the commercial voltage supplied to the main power supply switch 85, and to carry out various kinds of processing such as display images, for example, onto a not shown cathode ray tube display (CRT).

Under the waiting operation state of the television set 100, the waiting power supply portion 70 draws down the voltage level of the commercial voltage supplied from the commercial power supply 80, converts this into a direct current voltage for always outputting to the light-receiving portion 75. The lightreceiving portion 75 is arranged to always operate the direct current supplied from the waiting power supply portion 70 as the waiting power supply, and thereby always waits for the control signal supplied from the remote controller.

Figure 2:
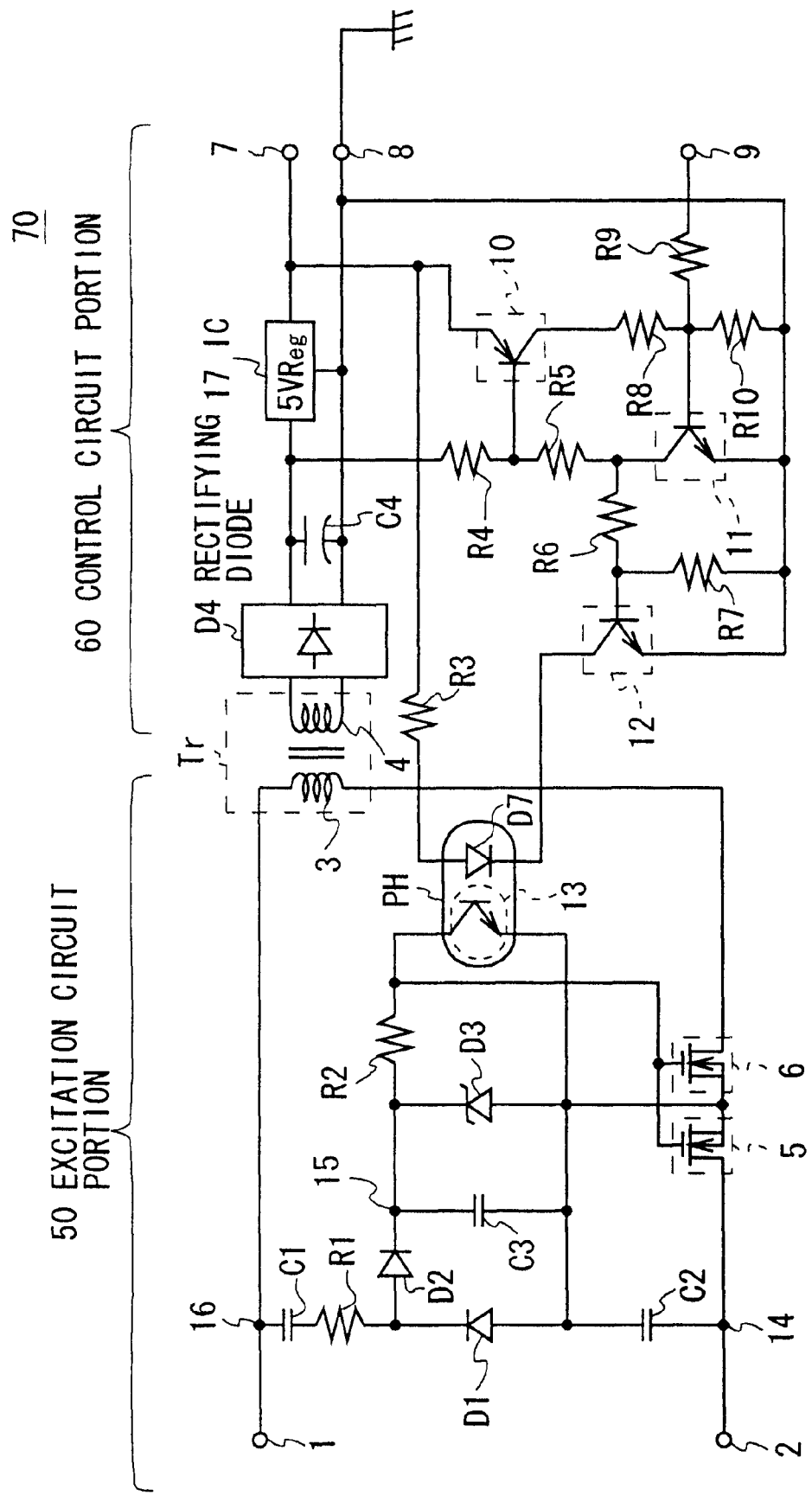
FIG. 2 is a circuit diagram showing a configuration of a waiting power supply portion according to a first embodiment.

FIG. 2 shows a circuit configuration of the waiting power supply portion 70, and the waiting power supply portion 70 has an excitation circuit portion 50 on the primary side of the power supply transformer Tr and has a control circuit portion 60 on the secondary side.

The excitation circuit portion 50 in its waiting operation state operates the control circuit portion 60 by initial excitation operation on the power supply transformer Tr based on the commercial voltage supplied via AC input ends 1 and 2 when an AC plug (not shown) is inserted into the commercial power supply 80 (see FIG. 1).

The control circuit portion 60 is arranged to make the television set 100 to remain in the waiting operation state by intermittently controlling the excitation operation halt and the normal excitation operation of the power supply transformer Tr in correspondence with necessity once the control circuit portion 60 is operated by initial excitation operation on the power supply transformer Tr based by the excitation circuit portion 50.

Here, an initial excitation operation refers to an operation to bring the power supply transformer Tr into an excitation state by the excitation circuit portion 50 in order to operate the control circuit portion 60 to maintain the waiting operation state of the television set 100 while a normal excitation operation refers to an operation to bring the power supply transformer Tr into an excitation state by the control circuit portion 60 after the initial excitation operation is over.

In the process of the power supply transformer TR starting the initial excitation operation after the AC plug of the television set is inserted into the commercial power supply 80, a negative voltage is supplied to the commercial voltage input end 1 from the commercial power supply 80, and a positive voltage is supplied to the commercial voltage input end 2 (t1 to t2 in FIG. 3A), and at this time a current flows in the excitation circuit portion 50 via a commercial voltage input end 2, a capacitor C2, a field effect transistor for switching (hereinafter to be referred to as field effect transistor (FET)) 6, a primary coil 3 of the power supply transformer Tr and a commercial voltage input end 1 sequentially. This serves to charge the capacitor C2 with electric charges so that the i connection point 14 side becomes positive.

In addition, until the voltages respectively supplied to the commercial voltage input ends 1 and 2 from the commercial power supply 80 become zero (t2 to t3 in FIG. 3A), the electric charges charged in the capacitor C2 is discharged to the excitation circuit portion 50 via the commercial voltage input end 2, the commercial power supply 80, the commercial voltage input end 1, the capacitor C1, the resistor R1, the rectifying diode D2, a capacitor to accumulate voltages to carry out onoperation of the FETs 5 and 6 (hereinafter to be referred to as switching voltage accumulating capacitor) C3 sequentially.

This serves to charge the capacitor C1 with electric charges so that the connection point 16 side becomes positive and to charge the switching voltage accumulating capacitor C3 with electric charges so that the connection point 15 side becomes positive. This serves to increase the voltage of the switching voltage accumulating capacitor C3.

Moreover, when a positive voltage is supplied to the commercial voltage input end 1 and a negative voltage is supplied to the commercial voltage input end 2 from the zero state of the voltages at the commercial voltage input ends 1 and 2 (t3 to t4 in FIG. 3A), and at this time electric charges charged in the capacitor C2 by the commercial voltage input end 1, the capacitor C1, the resistor R1, the rectifying diode D2, the switching voltage accumulating capacitor C3, the capacitor C2 and the commercial voltage input end 2 sequentially are discharged to the excitation circuit portion 50.

Here, when all the electric charges charged in the capacitor C2 are discharged, the electric current flows in the excitation circuit portion 50 via the commercial voltage input end 1, the capacitor C1, the resistor R1, the rectifying diode D2, the switching voltage accumulating capacitor C3, the FET 5, and the commercial voltage input end 2 sequentially. This serves to charge the capacitor C1 with electric charges so that the connection point 16 side becomes positive and to charge the switching voltage accumulating capacitor C3 with electric charges so that the connection point 15 side becomes positive.

In addition, until the voltages respectively supplied to the commercial voltage input ends 1 and 2 from the commercial power supply 80 become zero (t4 to t5 in FIG. 3A), the electric charges are charged in the capacitor C1 is discharged to the excitation circuit portion 50 via the commercial voltage input end 1, the commercial power supply 80, the commercial voltage input end 2, the capacitor C2, the rectifying diode D1, the resistant R1, and the capacitor C1 sequentially. This serves to charge the capacitor C2 with electric charges so that the connection point 14 side becomes positive.

Thus, when commercial voltages are supplied from the commercial power supply 80 (t1 to t3 in FIG. 3A), the excitation circuit portion 50 carries out charging the switching voltage accumulating capacitor C3 with electric current charges (accumulation of electric charges) which underwent half-wave rectification. Accordingly, when the commercial voltage is supplied from the commercial power supply 80 (FIG. 1) during a predetermined period (t5 to to in FIG. 3A), the excitation circuit portion 50 will repeatedly charge the switching voltage accumulating capacitor C3.

Incidentally, the resistor R1 is a limiting resistant provided so that, when high voltage spike noises are contained in the commercial voltage supplied form the commercial power-supply 80, the high voltage spike noises will not destroy respective elements inside the excitation circuit portion 50 via the capacitor C1, and is arranged not to give rise to any influence in the process of the excitation circuit portion 50 exciting the power supply transformer Tr. In addition, the charging into the switching voltage accumulating capacitor C3 is arranged to be limited to a predetermined level with the voltage limiting diode D3.

Figure 3:
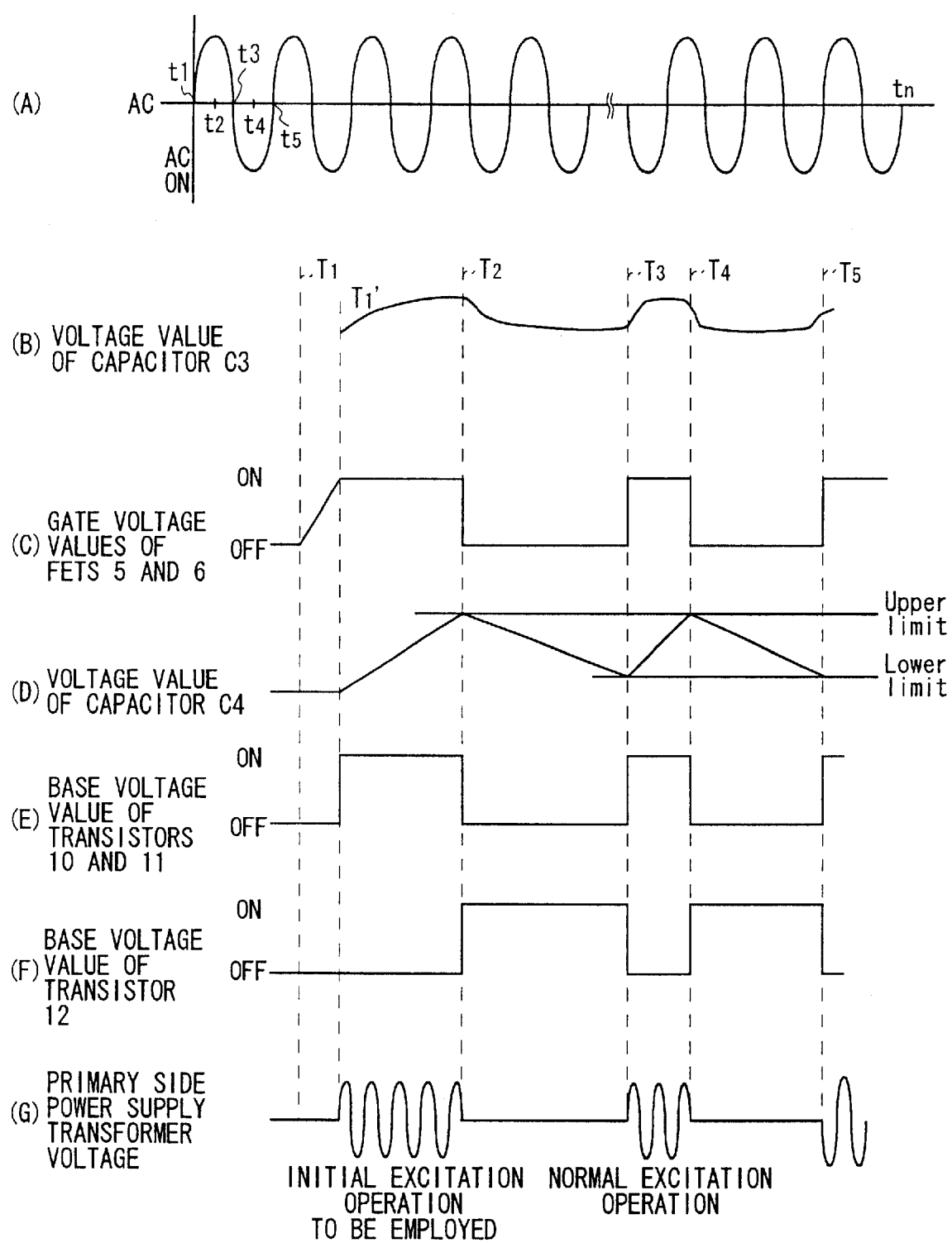
FIGS. 3A to 3G are timing charts showing a relationship between on voltage values and current values of various elements of the television's power supply.

Here, repeatedly charging the switching voltage accumulating capacitor C3 gives rise to a predetermined voltage value (T1' in FIG. 3B), and then the half-wave current supplied into the switching voltage accumulating capacitor C3 is supplied to the gate of the FET 5 and the gate of the FET 6 respectively via the resistor R2 so that this serves to switch on the FETs 5 and 6 (T1' in FIG. 3C).

At this time, the capacitor C2 will get short-circuited, and accordingly, the electric charges charged in the switching voltage accumulating capacitor C3 will become abundant (T1' and onward in FIG. 3B). As a result thereof, the charging voltage of the switching voltage accumulating capacitor C3 will be continued to be supplied to the gates of the FET 5 and the FET 6 respectively via the resistor R2 so that this serves to cause the FETs 5 and 6 to remain switched on. In this case, the commercial voltage from the commercial power supply 80 will be directly applied to the primary side of the power supply transformer Tr (T1' in FIG. 3G), and this serves to cause the power supply transformer Tr to execute the initial excitation operation.

Incidentally, in the case where the capacitance of the capacitor C1 and the capacitance of the capacitor C2 are the same, the capacitor C2 is shorted so that the electric charges accumulated in the switching voltage accumulating capacitor C3 will become approximately twice the electric charges having been accumulated before the capacitor C2 is brought into short circuit.

In addition, the commercial voltage is directly applied to the primary side of the power supply transformer Tr to cause the power supply transformer Tr to execute the initial excitation operation, the commercial voltage supplied to the primary coil 3 of the power supply transformer Tr is processed to become a direct voltage in the rectifying diode D4 via the secondary coil 4 of the power supply transformer Tr to be supplied to the control circuit portion 60. This serves to charge the capacitor to become the power supply of the control circuit portion 60 (hereinafter to be referred to as secondary side voltage accumulating capacitor) C4 with the direct current voltage (T1' in FIG. 3D) while the direct current voltage will start to be outputted to the light-receiving portion 75 (FIG. 1) via the output end 7.

Here once the inner voltage adjusting integrated circuit (IC) 17 provided inside the control circuit portion 60 is brought into the operation state with the direct current voltage supplied via the power supply transformer Tr, the rectifying diode D4 and the secondary side voltage accumulating capacitor C4 sequentially reaching a predetermined voltage value, the voltage inputted into the inner voltage adjusting IC 17 is arranged to be surveyed while the control circuit portion 60 is arranged to cause the FETs 5 and 6 to be switched off corresponding with the result of survey by the inner voltage adjusting IC 17. This serves to cause the power supply transformer Tr to halt its excitation operation.

That is, in the process from the initial excitation operation of the power supply transformer Tr to a halt, when the power supply transformer Tr starts the initial excitation operation, the input voltage and the output voltage of the inner voltage adjusting IC 17 rises respectively corresponding with the electric charges accumulated into the secondary side voltage accumulating capacitor C4 until the terminal voltage of the secondary side voltage accumulating capacitor C4 reaches a predetermined voltage level.

At this time, the voltage given to the base of the PNPtype transistor 10 is the terminal voltage of the secondary side voltage accumulating capacitor C4 divided by the voltage dividing resistors R4, R5, R6 and R7 while the voltage given to the emitter of the PNP-type transistor 10 is an output voltage of the inner voltage adjusting IC 17. Accordingly, the base voltage of the transistor 10 becomes lower than the emitter voltage, and as a result thereof, the transistor 10 is caused to switch on (T1' in FIG. 3E), and this serves to supply the output voltage of the inner voltage adjusting IC 17 to the base of the transistor 11 via the transistor 10 as well as the resistor R8.

This will serve to raise the base voltage of the transistor 11, and as a result thereof the transistor 11 is caused to switch on (T1' in FIG. 3E). In this case, as for the base voltage of the transistor 10, since voltage dividing resistors comprised of the voltage dividing resistors R4, R5, R6 and R7 will be voltage dividing resistors comprising of only the voltage dividing resistants R4 and R5, and this serves to cause the base voltage of the transistor 10 to be further lowered.

Accordingly, the currents flowing from the transistor 10 via the emitter gets abundant, and this is accompanied by the current flowing the emitter from the collector of the transistor 11 getting abundant, and therefore on-operation of the transistors 10 and 11 goes on.

Incidentally, the base of the transistor 11 is brought into connection with the terminal 9 via the resistor R9 for being switched on from outside. In addition, the resistors R8 and R10 are resistants to cause the transistor 11 to execute on-operation when a predetermined amount of collector currents of the transistor 10 flows. Moreover, the voltage dividing resistors R4, R5, R6 and R7 are arranged not to cause the transistor 12 to switch on before the transistors 10 and 11 are caused to execute on operation.

Here, the inner voltage adjusting IC 17 is provided with a predetermined voltage value so as to keep the voltage value inside the control circuit portion 60 constant once at the time of normal operation state, and therefore a voltage not less than a predetermined voltage level is input, the emitter voltage of the transistor 10 will be constant while the base voltage will be arranged to rise.

Accordingly, when the voltage input into the inner voltage adjusting IC 17 (that is, the voltage to be obtained by charging the secondary side voltage accumulating capacitor C4) exceeds a predetermined voltage level (T2: Upper limit in FIG. 3D), the transistor 10 will no longer be able to remain on since its base voltage rises.

This serves to cause the transistor 10 to switch off (T2 in FIG. 3E), and accordingly the base voltage of the transistor 11 will drop and as a result thereof the transistor 11 switches off (T2 in FIG. 3E).

This serves to cause the collector voltage of the transistor 11 to rise, and accompanied by this, the base voltage of the transistor 10 rises further to feed forward the off operation to cause the transistors 10 and 11 to immediately execute the "off operation" respectively. This will serve to cause the base voltage of the transistor 12 to rise, and as a result thereof, the transistor 12 switches on (T2 in FIG. 3F).

Accordingly, the electric currents output from the inner voltage adjusting IC 17 are supplied to the ground of the output end 8 via the resistor R3, the diode D7 inside the photocoupler PH insulating the primary side as well as the secondary side of the power supply transformer Tr, and the transistor 12 sequentially. At this time the transistor 13 inside the photocoupler PH is turned on.

This serves the electric currents supplied to the FETs 5 and 6 inside the excitation circuit portion 50 via the switching voltage accumulating capacitor C3 and the resistor R2 flow from the collector of the transistor 13 inside the photocoupler PH via the emitter. Accordingly, short circuit will be arranged to take place between the gate and the source respectively in the FETs 5 and 6 so that the FETs 5 and 6 switch off (T2 in FIG. 3C).

Accordingly, the commercial voltage supplied to the primary side of the power supply transformer Tr will no longer be supplied (T2 in FIG. 3G), and this serves to cause the power supply transformer Tr in the primary excitation operation to halt the excitation operation.

Thus, the control circuit portion 60 causes the switching FETs 5 and 6 to turn off when the voltage inputted to the inner voltage adjusting IC 17 inside it exceeds a predetermined voltage level, and this serves to cause the power supply transformer Tr to halt its excitation operation.

In addition, when the initial excitation operation of the power supply transformer Tr halts by the control circuit portion 60, the electric charges accumulated on the secondary side voltage accumulating capacitor C4 inside the control circuit portion 60 are discharged as load currents into the light-receiving portion 75 (FIG. 1) via inside the control circuit portion 60 and the output end 7 (T2 to T3 in FIG. 3D).

Here, when the voltage input into the inner voltage adjusting IC 17 drops to not more than a predetermined voltage level (T3: Lower limit in FIG. 3D), since the electric charges on the secondary side voltage accumulating capacitor C4 are discharged, the base voltage of the transistor 10 will become lower than the emitter voltage.

In this case, the transistor 10 turns on with the drop of the base voltage, and thereby the control circuit portion 60 causes the switching FETs 5 and 6 to turn on until the voltage inputted into the inner voltage adjusting IC 17 exceeds a predetermined voltage level as described above in the process from the initial excitation operation to the halt of excitation operation of the power supply transformer Tr. This causes the power supply transformer Tr to execute the normal excitation operation, and the direct currents having passed through the rectifying diode D4 are charged again into the secondary side voltage accumulating capacitor C4 (T3 to T4 in FIG. 3D).

Moreover, when the voltage value input into the inner voltage adjusting IC 17 exceeds a predetermined voltage level (T4 in FIG. 3D), the control circuit portion 60 causes the switching FETs 5 and 6 to turn off. This serves to cause the power supply transformer Tr to halt the excitation operation.

Thus, the control circuit portion 60 is arranged to cause the power supply transformer Tr to be switched off with the inner voltage adjusting IC 17 when the voltage inputted to the inner voltage adjusting IC 17 exceeds a predetermined voltage level, and to cause the power supply transformer Tr to be switched on with a decrease to lower than a predetermined voltage level, and this serves to control the power supply transformer Tr to execute the normal excitation operation and the halt of the excitation operation intermittently.

The output end 7 of the inner voltage adjusting IC 17 of the control circuit portion 60 always maintains a constant voltage, and this serves to cause the constant voltage to be applied to the light-receiving portion 75 via the output end 7. Accordingly, the control circuit portion 60 maintains the waiting operation state of the television set 100.

Thus, when the excitation circuit portion 50 is supplied with a commercial voltage via the AC input ends 1 and 2, it repeatedly supplies half-wave rectified currents into the switching voltage accumulating capacitor C3 to cause the FETs 5 and 6 to turn on so as to enable the power supply transformer Tr to execute the initial excitation operation.

In addition, the excitation circuit portion 50 causes the switching FETs 5 and 6 to turn on, and apply the commercial voltage supplied via the AC input ends 1 and 2 directly to the primary coil 3 of the power supply transformer Tr. This serves the secondary side voltage accumulating capacitor C4 of the control circuit portion 60 being the secondary side of power supply transformer Tr to be charged in a short period. That is, the excitation circuit portion 50 can charge the secondary side voltage accumulating capacitor C4 in a short period.

Accordingly, in the case where, for example, the power supply is cut off, or the commercial voltage is not supplied for a predetermined period from the (not shown) commercial power supply, when power supply from the commercial power supply 80 resumes its supply at the recovery from the powerless state, the excitation circuit portion 50 immediately repeats charging onto the switching voltage accumulating capacitor C3 so as to cause the FETs 5 and 6 to execute the on-operation, and this serves to enable the power supply transformer Tr to resume the initial excitation operation. This serves to enable the excitation circuit portion 50 to cause the control circuit portion 60 to execute the normal operation in a short period.

Moreover, the control circuit portion 60 is arranged to maintain the inner voltage at a constant level, and can cause the FETs 5 and 6 to turn on via the photocoupler PH in the case where it reaches not less than a predetermined voltage level, and cause the FETs 5 and 6 to execute the on-operation via the photocoupler PH in the case where it reaches not more than a predetermined voltage level, and thus can control excitation of the power supply transformer Tr intermittently.

Here, in a configuration of the waiting power supply portion 70, the consumed electric power of the excitation circuit portion to cause the FETs 5 and 6 to turn on is 5.121 $\mu$W breaking down to the electric power to pass the diode D2 (that is, 10V×0.5 $\mu$A=5 $\mu$W) and the electric power equivalent to the loss in the resistor R1 (that is, R1$^2$=100 k$\Omega$×(1.1 $\mu$A)$^2$=0.121 $\mu$W: presuming that the entire alternating currents have passed the diode D1), under assumption in particular, for example, of the capacity of the capacitor C4 being 4700 $\mu$F, the inner loss current value of the inner voltage adjusting IC 17 being 2 $\mu$A, the current value inside the transistor 13 of the photocoupler PH being 30 $\mu$A, the current value to flow in the transistors 10 and 11 being 10 $\mu$A, the upper limit voltage value of the input voltage in the inner voltage adjusting IC 17 being 8V, the lower limit voltage value of the input voltage in the inner voltage adjusting IC 17 being 6V, the charging efficiency of the capacitor C4 being 500, the charging time of the capacitor C4 being 50 ms, the current value to flow in the transistor 13 inside the photocoupler PH at the time when the FETs 5 and 6 turn off being 0.5 $\mu$A, the terminal voltage value of the switching voltage accumulating capacitor C3 being 10V, the resistor R1 value being 100 k$\Omega$, the excitation loss of the power supply transformer Tr being 0.1 W, the loss at the time when the FETs 5 and 6 execute the onoperation or the off-operation being 0, the leak current value of the respective capacitors C1 to C4 being 0, and the loss of the respective diodes D1 to D3 being 0.

In addition, in the charging electric power of the secondary side voltage accumulating capacitor C4, since difference between the energy when the capacitance of the secondary side voltage accumulating capacitor C4 has a voltage of 8V being the upper limit voltage value of the input voltage in the inner voltage adjusting IC 17 (that is, CV$^2$/2=0.1504J) and the energy when the capacitance of the capacitor C4 has a voltage of 6V being the lower limit voltage value of the input voltage in the inner voltage adjusting IC 17 (that is, CV$^2$/2=0.0846J) is 0.0658J, energy necessary for charging the capacitor C4 will be 0.1316J (that is, 0.0658J×2) due to the charging efficiency of the capacitor C4 being 500. Accordingly, the time until the voltage of the capacitor C4 reaches 8V from 6V will become 223.8 sec (that is, T=CV/I=4700 $\mu$F×2V/(2 $\mu$A+30 $\mu$A+10 $\mu$A) with CV=IT(C: capacitor capacitance, V: voltage balance, I: current, and T: time). Thereby, the average charging power of the secondary side voltage accumulating capacitor C4 for one cycle of charging and discharging will become 0.588 mW (that is, 0.1316J/(223.8 sec+0.05 sec).

Moreover, the average excitation power of the power supply transformer Tr will become 0.0223 mW (that is, 0.1 W×50 ms/(223.8 sec+0.05 sec with (excitation power)× (operation time)/(one cycle time).

That is, the calculative consumed power in assumption as described above in the waiting power supply portion 70 is 0.61542 mW (that. is, 0.00512 mW+0.588 mW+0.0223 mW). Actually, the consumed power of the waiting power supply portion 70 is deemed to increase due to involvement of items which were not assumed for calculation such as inrush current of the power supply transformer Tr or the like, but falls in the range not more than at least 1 mW.

In addition, assuming that the loading power is 1 mW and the power efficiency is 300, the added portion derived from connection of the load is 3.33 mW, and if 1 mW being the consumed portion inside the waiting power supply portion 70 is added thereto, the total will be 4.33 mW, and therefore the annual consumed power amount will become 37.93 Wh (that is, 0.00433 W×24 hours×365 days). Here, assuming 23 yen per 1 kWh, the billing charge of the annual consumed power will be 0.872 yen/year that is, 37.93 Wh×23 yen).

Accordingly, for example, if the electric equipment is arranged to operate with the waiting power supply portion 70 in replace of electric equipment to operate for 2 to 3 years with a battery, the billing charge for the annual consumed power can be reduced in calculation further in the electric equipment is arranged to operate with the waiting power supply portion 70 than in the electric equipment to operate for 2 to 3 years. This serves to enable the user who uses electric equipment to reduce the consumed charges for using the electric equipment.

Thus, the waiting power supply portion 70 has selected FETs 5 and 6 being the switching elements to be able to further reduce the power to make the excitation circuit portion 70 cause the power supply transformer Tr to execute the initial excitation operation and the power to make the control circuit portion 60 cause the power supply transformer Tr to execute the normal excitation operation and to halt the excitation operation.

In the configuration described so far, when the excitation circuit portion 50 provided on the primary side of the power supply transformer Tr is supplied with a commercial voltage, it repeats charging of electric currents having undergone half-wave rectification into the switching voltage accumulating capacitor C3 with the capacitors C1 and C2, the resistor R1, the resistor R2, the rectifying diode D1 and D2, the voltage limiting diode D3, and the switching voltage accumulating capacitor C3 as the direct current voltage generating circuit to cause the FETs 5 and 6 to turn on so as to cause the power supply transformer Tr to execute the initial excitation operation.

In this case, the excitation circuit portion 50 is arranged to apply the commercial voltage directly to the primary coil 3 of the power supply transformer Tr, and this serves to make the excitation circuit portion 50 to cause the control circuit portion 60, which is provided on the secondary side of the power supply transformer Tr and is arranged to operate with a little power, to execute the normal operation in a short period.

In addition, the control circuit portion 60 having reached the normal operation state is arranged to always survey the voltage value inside the control circuit so as to hold it at a constant level. That is, the control circuit portion 60 causes the FETs 5 and 6 to turn off by operating the photocoupler PH in the case where the voltage of the secondary side voltage accumulating capacitor C4 reaches not less than a predetermined voltage level, and at the same time, causes the FETs 5 and 6 to turn on by halting the operation of the photocoupler PH in the case where the voltage of the secondary side voltage accumulating capacitor C4 reaches not more than a predetermined voltage level.

Accordingly, the control circuit portion 60 can cause the FETs 5 and 6 to turn on and off via the photocoupler PH corresponding with the voltage value of the secondary side voltage accumulating capacitor C4, and thereby the excitation circuit portion 50 excites or halts the power supply transformer Tr with on-and-off operation of the FETs 5 and 6. That is, the control circuit portion 60 can operate with a little power so as to control the power supply transformer Tr intermittently.

Moreover, the waiting power supply portion 70 has selected FETs 5 and 6 being the switching elements for executing the initial excitation operation, the normal excitation operation and the excitation operation half of the power supply transformer Tr to be able to further reduce the power to make the excitation circuit portion 50 cause the power supply transformer Tr to execute the initial excitation operation and the power to make the control circuit cause the power supply transformer Tr to execute the normal excitation operation and to halt the excitation operation.

According to the configuration described so far, the excitation circuit portion 50 is provided on the primary side of the power supply transformer Tr and the control circuit portion 60 is provided in the secondary portion, so that the control circuit portion 60 controls the excitation circuit portion 50 intermittently, and thus they operate with the switching voltage accumulating capacitor C3 and the secondary switching voltage accumulating capacitor C4 having a little capacitance and therefore can suppress the consumed power of the waiting power supply portion 70 further and thus can plan energy saving further efficiently.

Figure 4:
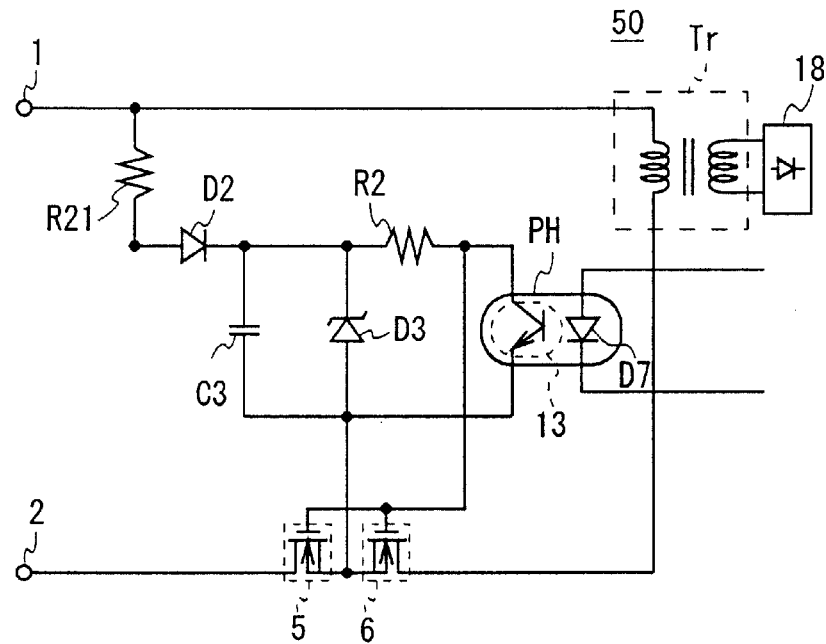
FIGS. 4 to 9 are circuit diagrams showing various configurations of excitation circuit portions according to other embodiments of the television.

Incidentally, in the above described first embodiment, the case where the turn on of the FETs 5 and 6 as well as charging of the switching voltage accumulating capacitor C3 is executed via reaction by the capacitor C1 and the capacitor C2 was described, but the present invention is not limited hereto and in FIG. 4 where the portions corresponding with those in FIG. 2 are given the same reference numerals and characters, the turn on of the FETs 5 and 6 may be arranged to be executed with the resistor R21. In this case, since the primary side loss of the power supply transformer Tr is less also compared with the entire loss of the waiting power supply portion 70, the on-operation of the switching elements (FETs 5 and 6) for placing the power supply transformer Tr in an excitation state may be executed with the resistor R2 so as to make the effects similar to the above described embodiment obtainable.

Figure 5:
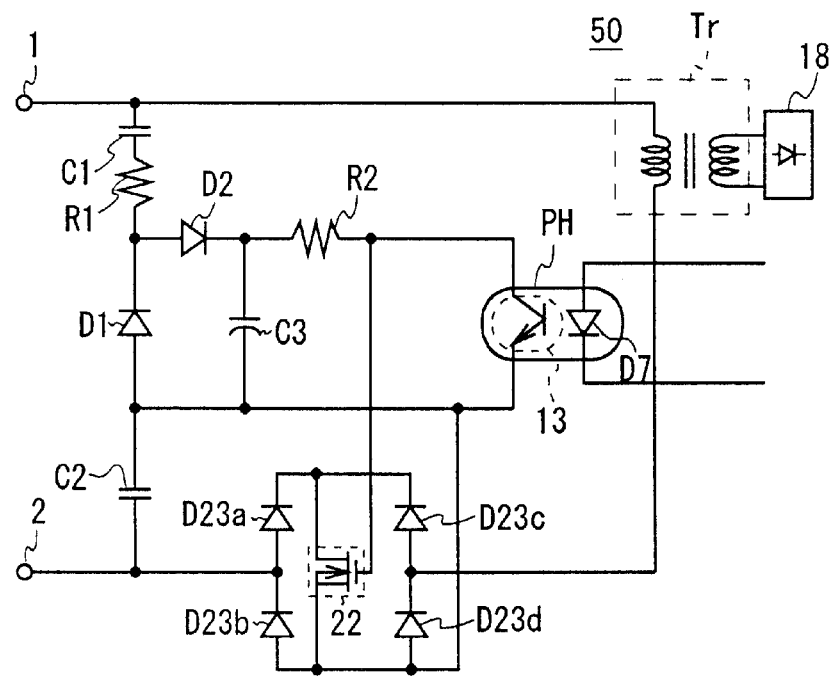

In addition, in the above described first embodiment, the case where FETs 5 and 6 were used as the switching elements to place the power supply transformer Tr in the excitation state was described, but the present invention is not limited hereto and in FIG. 5 where the portions corresponding with those in FIG. 2 are given the same reference numerals and characters, a switching element comprising only FET 22 and bridge diodes D23a, D23b, D23c and D23d to be used in common may be arranged to use used. In this case, since only one FET 22 is provided, such occurrence will take place less than in the case of FETs 5 and 6 that direct current will flow in the primary coil 3 of the power supply transformer Tr due to deviation in features of FETs.

Figure 6:
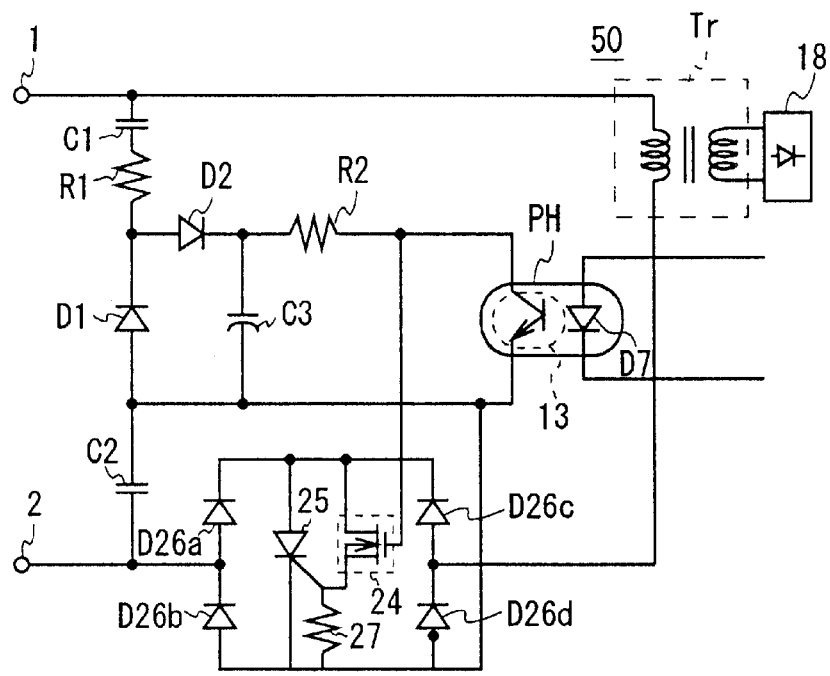

In addition, in the above described first embodiment, the case where FETs 5 and 6 were used as the switching elements to place the power supply transformer Tr in the excitation state was described, but the present invention is not limited hereto and in FIG. 6 where the portions corresponding with those in FIG. 2 are given the same reference numerals and characters, switching element comprising by combining FET 24, a resistor brought into connection in series with the FET 24 and a thyristor 25 with which bridge diodes D26a, D26b, D26c and D26d are used in common may be arranged to be used. In this case, features of the thyristor can make it easy to cope with a large current.

Figure 7:
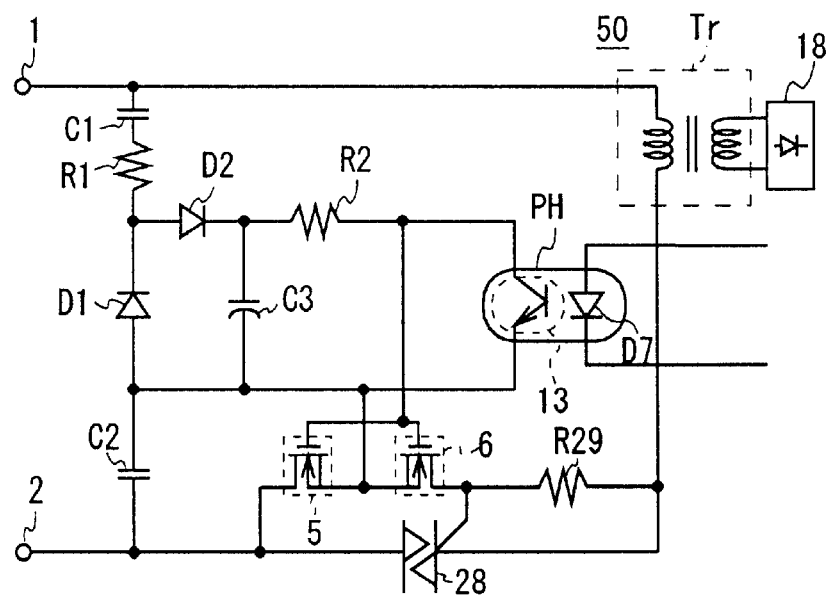

In addition, in the above described first embodiment, the case where FETs 5 and 6 were used as the switching elements to place the power supply transformer Tr in the excitation state was described, but the present invention is not limited hereto and in FIG. 7 where the portions corresponding with those in FIG. 2 are given the same reference numerals and characters, a switching element by combining the FETs 5 and 6, a limiting resistor brought into connection with the FETs 5 and 6 in series, and a triac 28 may be arranged to be used. In this case, features of the triac can make it easy to cope with a large current.

Figure 8:
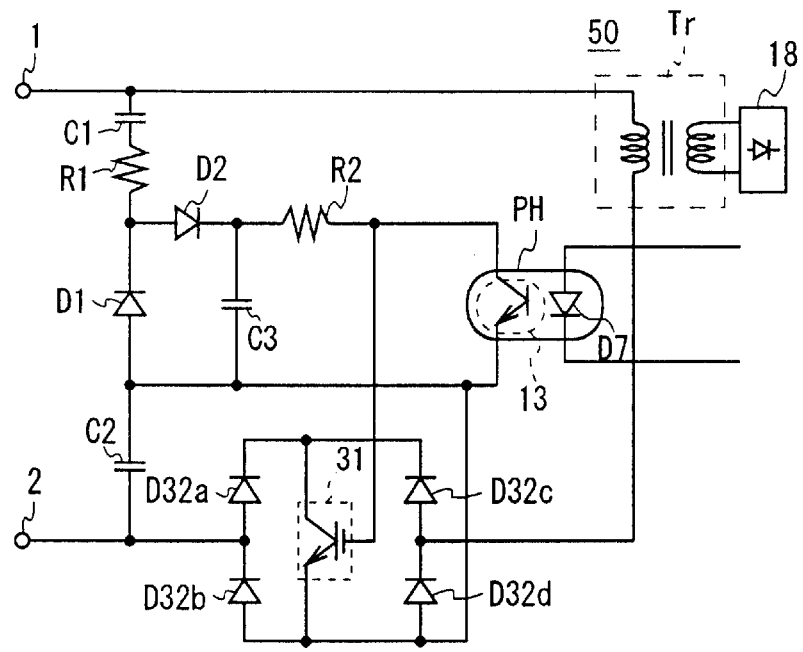

Incidentally, in the above described first embodiment, the case where FETs 5 and 6 were used as the switching elements to place the power supply transformer Tr in the excitation state was described, but the present invention is not limited hereto and in FIG. 8 where the portions corresponding with those in FIG. 2 are given the same reference numerals and characters, a switching element using an IGBT (Insulated Gate Bipolar Transistor) 31 and using the bridge diodes D32a, D32b, D32c, and D32d in common may be arranged to be used. In this case, the same effect as in the above described embodiment is obtainable.

Figure 9:
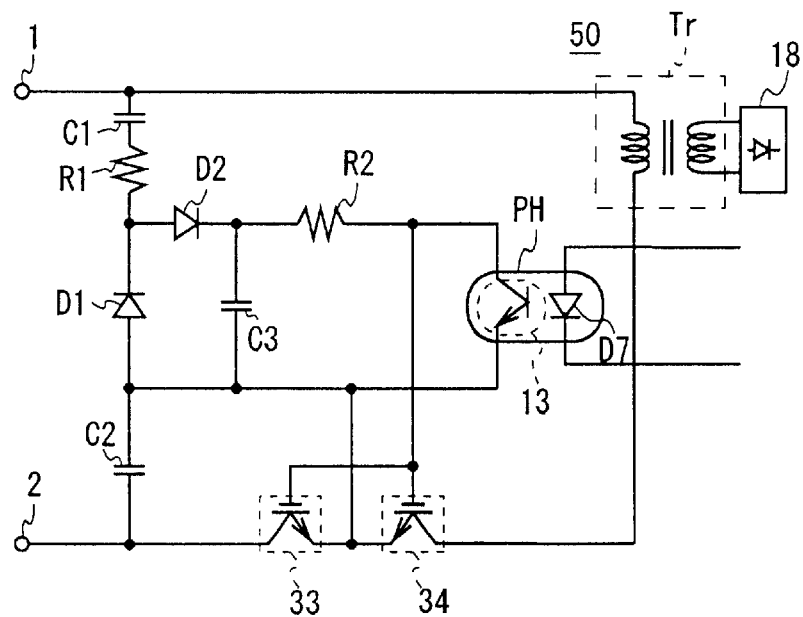

Incidentally, in the above described first embodiment, the case where FETs 5 and 6 were used as the switching elements to place the power supply transformer Tr in the excitation state was described, but the present invention is not limited hereto and in FIG. 9 where the portions corresponding with those in FIG. 2 are given the same reference numerals and characters, a switching element comprising IGBTs (Insulated Gate Bipolar Transistor) 33 and 34 brought into connection in series may be used. In this case, the same effect as in the above described embodiment is obtainable.

Figure 10:
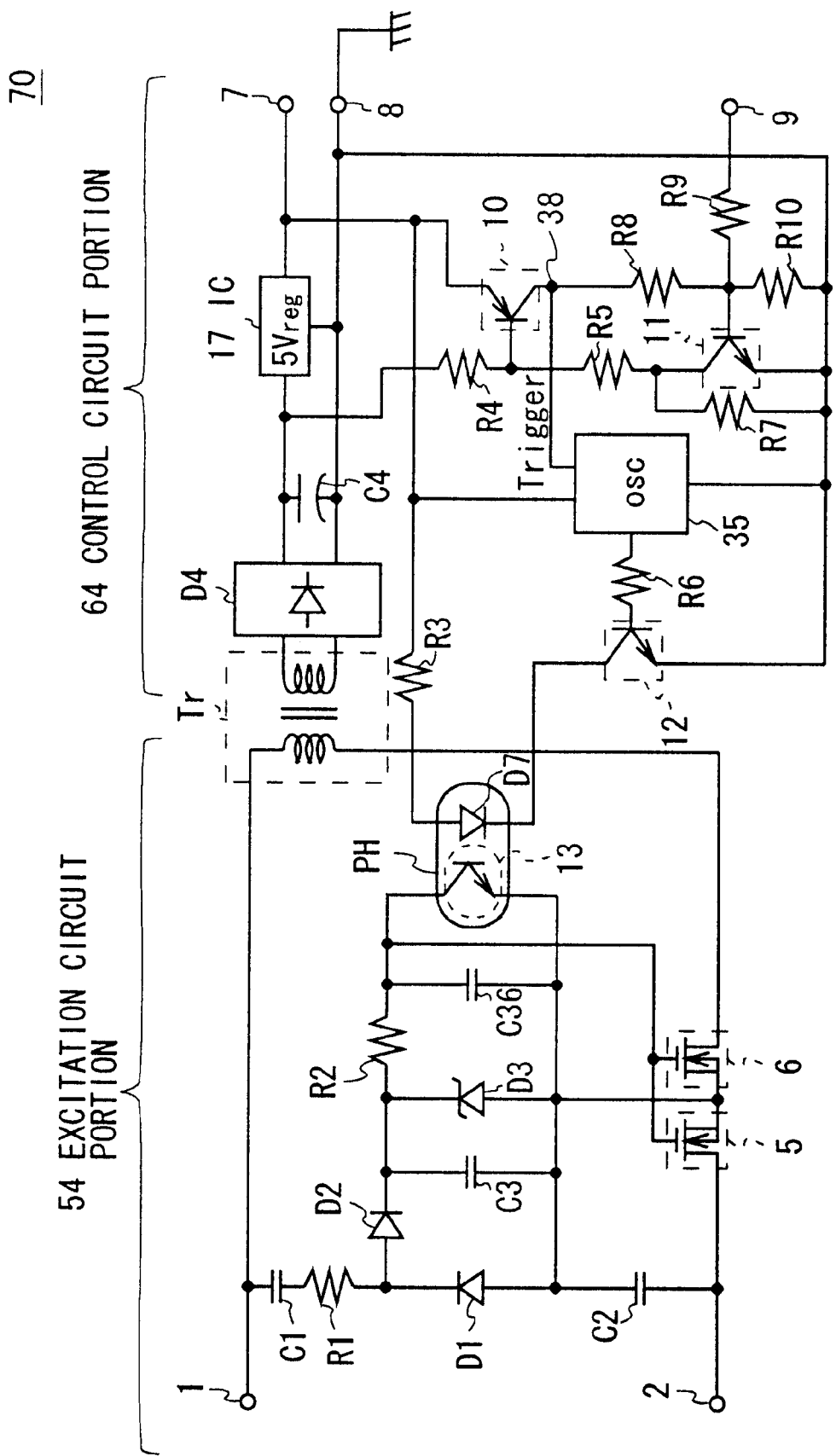
FIG. 10 is a circuit diagram showing a configuration of a waiting power supply portion according to another embodiment.

In addition, in the above described first embodiment, the case where the on-operation of the photocoupler PH is executed by the on-operation of the transistor 12 being executed inside the control circuit portion 60 was described, but the present invention is not limited hereto and in FIG. 10 where the portions corresponding with those in FIG. 2 are given the same reference numerals and characters, an oscillator (OSC) 35 may be provided inside the control circuit 64 so that the photocoupler PH is caused to execute the on-and-off operation based on the pulse waveforms outputted from the oscillator 35, and when the photocoupler PH is in the off-operation, the turn off of the FETs 5 and 6 is maintained by a current charged in the capacitor C36 which was applied to the direct current voltage circuit inside the excitation circuit 54. In this case, the control circuit 64 can make the average current to flow in the photocoupler PH further less.

Figure 11:
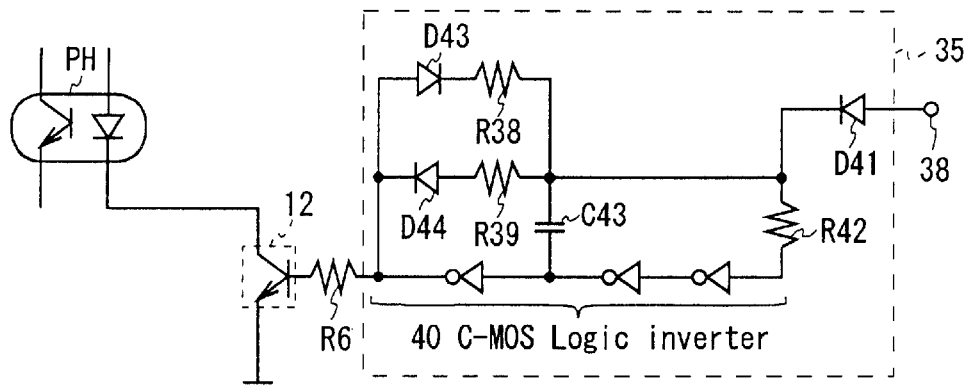
FIG. 11 is a circuit diagram showing a configuration of an OSC.

Incidentally, FIG. 11 shows an example of a circuit configuration of the oscillator 35, which is configured by comprising diodes D41, D43, and D44 and the resistors R38, R39, and R42, and capacitors C43 and C-MOS Logic inverter 40. In this case, in the oscillator 35, the resistor R38 is made to take a value less than that for the resistant R39 so that the base voltage of the transistor 12 having waveform as shown in FIG. 12 is output.

In addition, in the oscillator 35 in this case, the C-MOS Logic inverter 40 is used so that the transistor 12 can be made to operate with further less current. That is, when the logical level of signals supplied via the trigger terminal 38 (in FIG. 11) reaches Hi, the oscillator 35 is arranged to bring the logical level of the pulse given to the transistor 12 to Lo, and as a result thereof the photocoupler PH (in FIG. 11) turns off.

Figure 12:
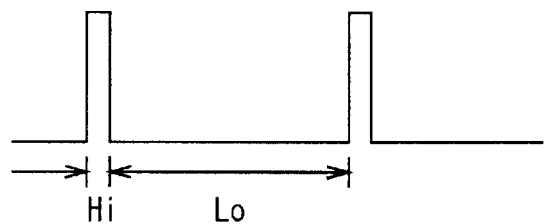
FIG. 12 is a schematic image showing a pulse wave outputted from the OSC.

On the other hand, when the logical level of signals supplied via the trigger terminal 38 (in FIG. 11) reaches Lo, the oscillator 35 is arranged to apply the voltage as shown in FIG. 12 to the base of the transistor 12, and as a result thereof the photocoupler PH (in FIG. 11) is arranged to execute the on-and-off operation rapidly so that the capacitor C36 (in FIG. 10) holds the gate voltage of the FETs 5 and 6 at Lo.

Figure 13:
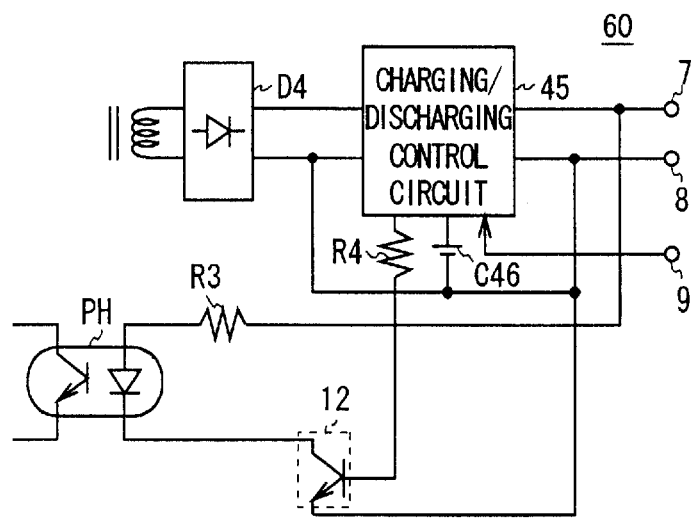
FIG. 13 is a circuit diagram showing a configuration of a control circuit portion according to another embodiment.

In addition, in the above described first embodiment, the case where with the power supply transformer Tr being in the excitation halt state the control circuit port 60 operates based on the electric charges charged on the secondary side voltage accumulating capacitor C4 was described, but the present linvention is not limited hereto and in stead of the secondary side voltage accumulating capacitor C4 a secondary battery which can execute charging-discharging may be provided. In this case, in FIG. 13 where the portions corresponding with those in FIG. 2 are given the same reference numerals and characters, a secondary side voltage accumulating control circuit 45 should be arranged to be provided in accordance with the kinds of the secondary battery. That is, the secondary side voltage accumulating control circuit 45 halts charging the secondary battery C46 when the voltage inside the control circuit portion 60 exceeds a predetermined voltage level, and on the contrary hereto, when it goes down to lower than the predetermined voltage level, the circuit proceeds with charging the secondary battery C46. This should serve to plan energy saving further efficiently than in the above described embodiment.

(2) Second Embodiment

Figure 14:
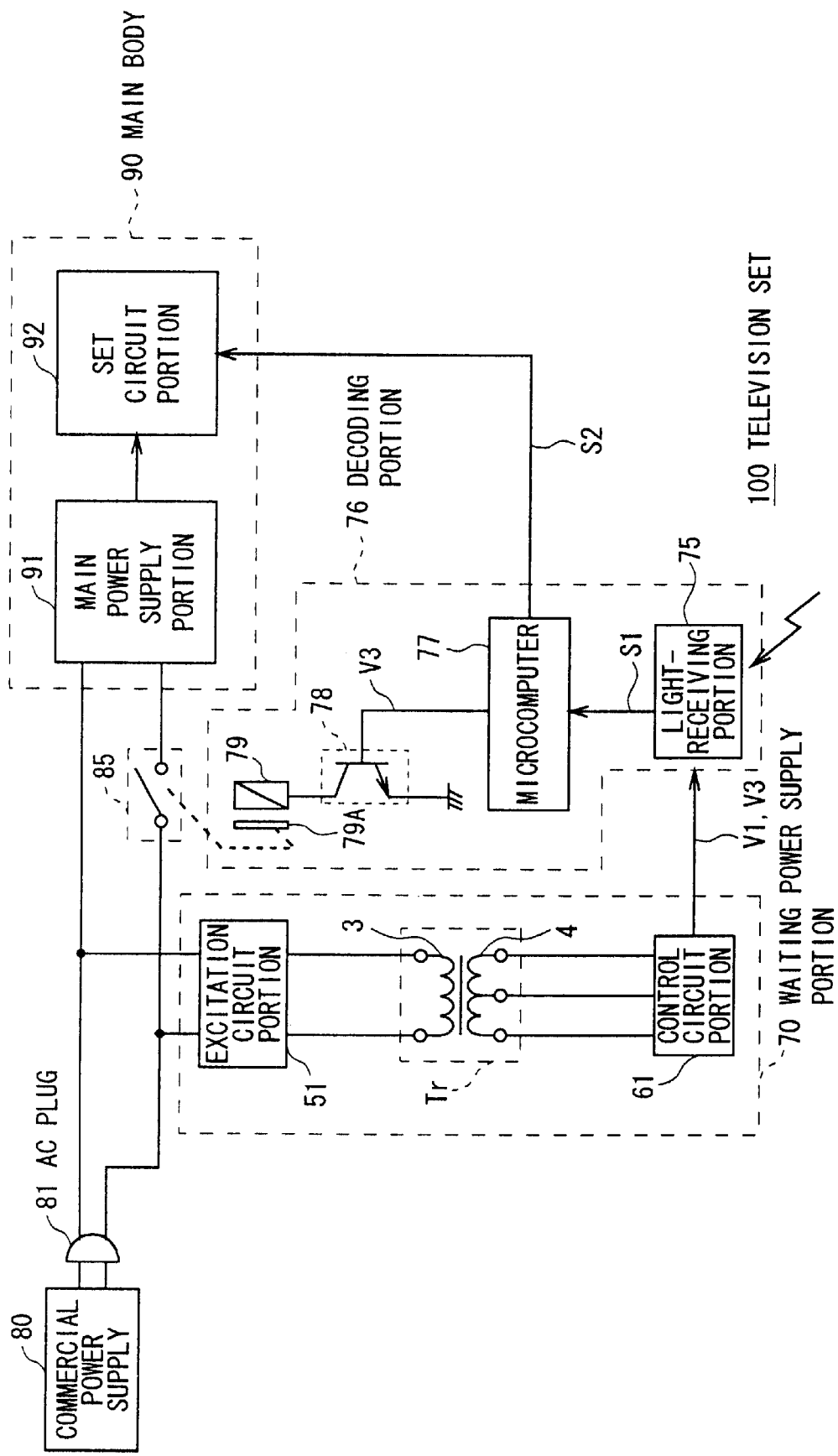
FIG. 14 is a block diagram showing the entire configuration of the television set.

In FIG. 14 where the portions corresponding with those in FIG. 1 and FIG. 2 are given the same reference numerals and characters, in the television set 100, when an AC plug 81 is inserted into the commercial power supply 80, the commercial voltage is supplied only to the waiting power supply portion 70 via the commercial power supply 80 and the AC plug 81 sequentially (the waiting operation state). In this waiting operation state, the waiting power supply portion 70 of the television set 100 supplies the commercial voltage supplied from the AC plug 81 with the primary side excitation circuit portion 51 of the power supply transformer Tr to the primary coil 3 of the power supply transformer Tr which is made to execute the primary excitation operation so that the commercial voltage is supplied to the secondary side control circuit portion 61 via the primary coil 3 and the secondary coil 4 sequentially.

The control circuit portion 61 draws down the commercial voltage supplied from the excitation circuit portion 51 by a predetermined level and converts into a direct current voltage, and once it is brought into operation by the direct current voltage, by intermittently controlling the excitation operation of the power supply transformer Tr in the excitation circuit portion 51 in correspondence with necessity the waiting voltage V1 for operating the decoding portion 76 is always supplied to the decoding portion 76.

The decoding portion 76 operates with the waiting voltage V1 supplied from the waiting power supply portion 70, and is arranged to wait for and receive by the light-receiving portion 75 the infrared signals supplied from the (not shown) remote controller.

Here, the decoding portion 76 receives by the lightreceiving portion 75 the light of the infrared signals supplied from the (not shown) remote controller, and then proceeds with photoelectric conversion of the infrared signals to extract the control signals S1 and transmit these into the microcomputer 77.

The microcomputer 77 creates the code signals S2 by implementing the decoding processing on the control signals SI, and in the case where the code signals S2 is an order for switching on the main power supply into the television set 100, the relay coil driving direct current voltage V3 supplied from the control circuit portion 61 is supplied to the amplifying transistor 78.

Incidentally, in the case where the code signals S2 are not an order for switching on the main power supply into the television set 100, the microcomputer 77 gives the order signals S2 corresponding with the code signals to the set circuit portion 92 of the main body 90.

The amplifying transistor 78 draws up the relay coil driving direct current voltage V3 to reach a predetermined level so as to supply the relay coil 79 with the drawn-up relay coil driving direct current voltage V3.

Thereby the relay coil 79 causes the movable iron piece 79A disposed at a distance with the magnetic power generated based on the relay coil driving direct current voltage V3 drawnup by a predetermined level to be absorbed into the (not shown) internal iron piece to execute on-operation on the main power supply switch 85 linked with the absorbing operation so as to supply the main power supply portion 91 of the main body 90 with the commercial voltage from the commercial power supply 80.

The main power supply portion 91 converts the commercial voltage from the commercial power supply 80 into a direct current voltage so as to draw this up by a predetermined level to be supplied to the set circuit portion 92. The set circuit portion 92 display the image based on the image signals received from the antenna on CRT and executes various kinds of processing corresponding with the order signals S2 supplied from the microcomputer 77.

Thus, in the case where the code signal S2 is an order for switching on the main power supply in the television set 100, the television set 100 is arranged to shift from the waiting operation state to the state of switching on the main power supply and to realize various kinds of functions that the television set 100 have.

Next, in FIG. 15 where the portions corresponding with those in FIG. 2 are given the same reference numerals and characters, an operation state of a waiting power supply portion 70 (an excitation circuit portion 51 and a control circuit portion 61) which exists inside the television set 100 in the waiting operation state will be described in detail.

In the waiting power supply portion 70, when an AC plug 81 is inserted into the commercial power supply 80 (in FIG. 14), the excitation circuit portion S1 half-wave-rectifies with the rectifying diodes D1 and D2 the commercial voltage supplied via the commercial power supply 80 and the AC plug 81 sequentially to charge the switching voltage accumulating capacitor C3 from the side of the connection point 15 and half-wave-rectifies the same with the rectifying diodes D1 and D5 to charge the capacitor C6 from the side of the connection point 21.

Here, the charged voltage created by charging the capacitor C6 from the side of the connection point 21 is added as the base voltage of the transistor 20.

In addition, the charged voltage taking place by charging the switching voltage accumulating capacitor C3 from the connection point 15 is added to the gate of the FETs 5 and 6 via the resistant R2 and the resistant R11 sequentially, and thereby the FETs 5 and 6 turn on.

Accordingly the excitation circuit portion 51 supplies the alternating current supplied via the AC plug 81 to the primary coil 3 of the power supply transformer Tr, and thereby causes the power supply transformer Tr to execute the initial excitation operation.

Thus, the excitation circuit portion 51 supplies the gates of the FETs 5 and 6 with a direct current voltage by the capacitors C1, C2, C6 and C7 as the direct current voltage generating circuit, the switching voltage accumulating capacitor C3, the resistors R1, R2, R10, R11 and R12, the rectifying diodes D1, D2 and D5, and the voltage controlling diodes D3 and D10, and the transistor 20 so that the FETs 5 and 6 are made to turn on.

The power supply transformer Tr is brought into the initial excitation operation by the excitation circuit portion 51 and then supplies the control circuit portion 61 via the secondary coil 4 with the alternating electric current supplied to the primary coil 3.

The control circuit portion 61 rectifies the commercial voltage supplied from the secondary coil 4 of the power supply transformer Tr with the rectifying diode D4, and charges the rectified direct current voltage into the secondary side voltage accumulating capacitor C4, the capacitor (hereinafter to be referred to as a relay driving capacitor) C8 for accumulating the relay coil driving direct current voltage V3 (in FIG. 14), and the capacitor (hereinafter to be referred to as a waiting voltage accumulating capacitor) C9 for accumulating the waiting voltage V1.

At this time, the inner voltage adjusting IC 17 operates when the charged voltage having taken place by charging the secondary side voltage accumulating capacitor C4 has reached a predetermined value, and thereby the output end 17b is arranged to always provide a constant voltage.

This serves to cause the inner voltage adjusting IC 17 to charge a capacitor for accumulating the waiting voltage V1 (with respect hereto hereinafter to be referred to a waiting voltage accumulating capacitor) with a predetermined value of direct currents via the output end 17b of the inner voltage adjusting IC 17.

Here, in the load current avoiding portion 59, it is arranged that the load current flows into the input end 17a of the inner voltage adjusting IC 17, and then a voltage is generated at the both ends of the resistor R111 to be applied between the base and emitter of the transistor 119.

Accordingly, in the load current avoiding portion 59, the voltage generated at the both ends of the resistor R111 reaches a predetermined value, and then a current starts flowing into the base of the transistor 119 but the current equivalent to that amplified portion flows between the emitter and collector of the transistor 119 to become a current avoiding the inner voltage adjusting IC 17.

That is, the load current avoiding 59 is arranged to obtain the output for the exceeding portion of the current flowing into the inner voltage adjusting IC 17 as the output of the control circuit portion 61.

Incidentally, the secondary side voltage accumulating capacitor C4, the relay driving capacitor C8, and the waiting voltage accumulating capacitors C9 and C10 is a polarized capacitor (chemical capacitor) to be charged only from the respectively corresponding connection ends 55, 56, 57 and 58.

In this state, to the base voltage of the transistor 10, the voltage portion derived from voltage division with the voltage dividing resistants R4, R5, R6 and R7 on the charged voltage taking place by charging the secondary side voltage accumulating capacitor C4 has been applied, and the emitter voltage of the transistor 10 is made constant with the inner voltage adjusting IC 17 which has operated with the initial excitation operation of the power supply transistor Tr.

Accordingly, the transistor 10 turns on since the base voltage is less than the emitter voltage during the initial period when the secondary side voltage accumulating capacitor C4 is being charged.

In this case, the transistor 11 switches on since a voltage is generated between the base and emitter with the collector current of the transistor 10. At this time, the base voltage of the transistor 10 undergoes voltage division not with the voltage dividing resistors R4 and R5, R6 and R7 but with voltage dividing resistors R4 and R5 only, and therefore drops rapidly, and accompanied thereby, the on-operation of the transistor 10 is accelerated.

Accordingly, the transistor 10 supplies a large amount of current from the collector to the transistor 11 and accompanied herewith the transistor 11 supplies a large amount of current between the collector-emitter, and to the ground via the output end 8.

Thus, the control circuit portion 61 is arranged to maintain the mutual on-operation with the feedforward (hereinafter to be referred to as excitation operation starting feedforward with respect thereto) in accordance with the onoperation of the transistor 10 and the on-operation of the transistor 11.

At this time, the transistor 11 turns on when a short circuit takes place between the base and the emitter to bring the transistor 12 into off-operation. Accordingly, it will not operate since no current is supplied to the photocoupler PH from the output end 17b of the inner voltage adjusting IC 17.

Here, as for the transistor 10, corresponding with a rise of the charged voltage taking place due to continuous charge on the secondary side voltage accumulating capacitor C4, the base voltage rises, and when the charged voltage exceeds a first threshold value, the base voltage starting exceeding the emitter voltage so as to gradually stop providing the currents which are flowing between the emitter and the collector.

Thereby, the transistor 11 will be gradually supplied with less voltage that used to take place between the base and the emitter and will turn off in due course. Accordingly the base voltage of the transistor 10 undergoes voltage division not with the voltage dividing resistors R4 and R5 but with voltage dividing resistors R4, R5, R6 and R7 in which the voltage dividing resistors R6 and R7 are additional, and therefore rises rapidly, and accompanied thereby, the turn off of the transistors 10 and 11 is accelerated.

This serves to cause the transistor 10 to completely cut off the current flowing between the emitter and the collector. At this time, the current supplied from the secondary side voltage accumulating capacitor C4 with the turn off of the transistor 11 is given to the base to execute the on-operation on the transistor 12, and thereby the current supplied from the output end 17b of the inner voltage adjusting IC 17 is supplied to the ground of the output end 8 via the resistor R13 and the diode D7 of the photocoupler PH insulating the primary side and the secondary side of the power supply transformer Tr sequentially.

Here, in the control circuit portion 61, the resistor R13 is selected with a small resistor value, and thereby is arranged to be capable of cause a large amount of current to flow into the diode 13 of the photocoupler PH.

Thereby, the control circuit portion 61 is arranged to be capable of always holding the correlation between the operating state of the transistor 13 of the photocoupler PH and the operating state of the transistor 20 (to avoid so-called deviation).

Accordingly, the sufficient operation of the diode D7 inside the photocoupler PH and the on-operation of the transistor 13 inside the photocoupler PH decreases the collector voltage of the transistor 20 in the excitation circuit portion 51 without fail, and accompanied thereby the gate voltage of the FETs 5 and 6 is caused to drop so as to cause the FETs 5 and 6 to turn off without fail.

Accordingly, the excitation circuit portion 51 does not supply the primary coil 3 of the power supply transformer Tr with the alternating current from the AC plug 81, and this serves to halt the initial excitation operation of the power supply transformer Tr without fail.

At this time, in the control circuit portion 61, the charged voltage generated by charging the relay driving capacitor C8 and the waiting voltage accumulating capacitors C9 and C10 are supplied to the decoding portion 76 as the waiting voltage V1 (in FIG. 14) via the corresponding output ends 22 and 7 respectively.

Thus, in the control circuit portion 61, after the inner voltage adjusting IC 17 operates, in the case where the charged voltage by the secondary side voltage accumulating capacitor C4 exceeds the first threshold value, the feedforward (hereinafter to be referred to as excitation operation halting feedforward with respect thereto) in accordance with the turn off of the transistor 10 and the turn off of the transistor 11 causes the transistor 12 to turn on so that the photocoupler PH of the excitation circuit portion 51 is operated to halt the excitation operation (the initial excitation operation) of the power supply transformer Tr.

Here, the control circuit portion 61 discharges the electrical charges charged on the secondary side voltage accumulating capacitor C4 gradually, resulting in that the charged voltage of the secondary side voltage accumulating capacitor C4 falls under the second threshold value, and then brings the transistor 12 and the photocoupler PH into off-operation with the excitation operation starting feedforward.

In this case, in the excitation circuit portion 51, since the transistor 13 inside the photocoupler PH is turned off, the collector voltage of the transistor 20 rises and the gate voltages of the FETs 5 and 6 rise so that the FETs 5 and 6 turn on.

Accordingly, the excitation circuit portion 51 supplies the alternating current from the AC plug 81 to the primary coil 3 of the power supply transformer Tr, and thereby brings the power supply transformer Tr into the normal excitation operation.

At this time, the control circuit portion 61 rectifies the commercial voltage supplied from the secondary coil 4 of the power supply transformer Tr with the rectifying diode D4, and charges the rectified direct current into the secondary side voltage accumulating capacitor C4, the relay driving capacitor C8, the waiting voltage accumulating capacitors C9 and C10 respectively.

Thus, it is arranged that the control circuit portion 61 executes operation control on the photocoupler PH of the excitation circuit portion 51 intermittently corresponding with the charged voltage value of the secondary side voltage accumulating capacitor C4 with the transistor 12 which executes the on-and-off operation linked with the feedforward for excitation operation start or the feedforward for excitation operation halt of the transistor 10 and the transistor 11 so as to always secure a predetermined level of the charged voltage generated by charging the relay driving capacitor C8, the waiting voltage accumulating capacitors C9 and C10, and can always supply this to the decoding portion 76 as the waiting voltage V1 (in FIG. 14) and the relay coil driving direct current voltage V3 (in FIG. 4).

Such a control circuit portion 61 is arranged to be capable of supplying a lot of voltage to the decoding portion 76 by providing the relay driving capacitor C8 and the waiting voltage accumulating capacitors C9 and C1 compared with the above described first embodiment.

Accordingly, the control circuit portion 61 is arranged to suppress the increase in the consumed electric power to minimum, and to be capable of securing a large current to be consumed by the decoding portion 76.

In the configuration described so far, the control circuit portion 61 is provided with a load current avoiding portion 59 in order to avoid a rise of the internal load current of the inner voltage adjusting IC 17, and the resistor R13 with a small resistor value was selected.

Accordingly, the control circuit portion 61 suppresses the current flowing inside the inner voltage adjusting IC 17 to a lower level and utilizes the voltage drop of the resistor R111 to cause a portion of the load current to flow into the load current avoiding portion 59 so that a large current in total flows.

Thus, the control circuit portion 61 adds the load current avoiding 59 so as to enable a large current in total to flow without increasing load of the inner voltage adjusting IC 17, and thereby enables the load current avoiding 59 to execute voltage adjustment without fail.

Accordingly, the control circuit portion 61 can execute the excitation operation start feedforward or the excitation operation halt feedforward by the transistors 10 and 11 in a stable fashion, and thereby the control circuit portion 61 can execute the operation of the operation halt control of the photocoupler PH in a stable fashion.

In addition, the control circuit portion 61 has selected the resistor R13 with a small resistance value so as to make the current supply large at the time when the photocoupler PH is driven, and therefore, in the case where the photocoupler PH is operating, the transistor 13 of the excitation circuit portion 51 can be operated on without depending on deviation of components of the unit transistor 13 inside the photocoupler PH.

Thereby, the excitation circuit portion 51 executes the on-and-off operation of the FETs 5 and 6 without fail and is capable of bringing the power supply transformer Tr into the excitation operation state or the non excitation operation state.

According to the configuration described so far, the control circuit portion 61 is provided with a load current avoiding portion 59 in order to avoid rise of the internal load in current of the inner voltage adjusting IC 17, and the resistor R13 with a small resistance value was selected, and therefore the charged voltage of a predetermined level generated by charging the secondary side voltage accumulating capacitor C4, the relay driving capacitor C8, and the waiting voltage accumulating capacitors C9 and C10 by executing the operation control of the photocoupler PH intermittently without fail can always be secured and operation reliability can be improved.

(3) Third Embodiment

Figure 16:
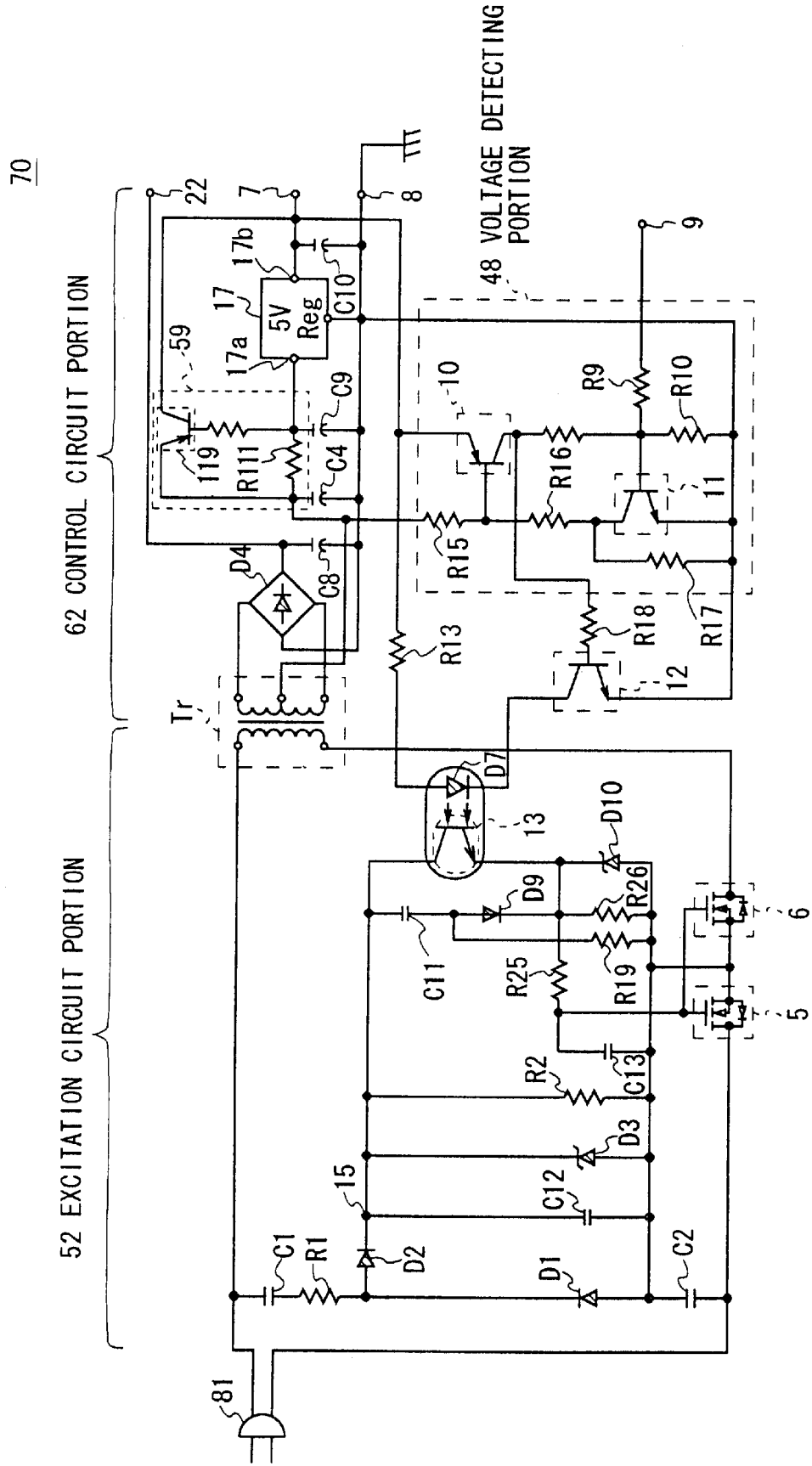
FIG. 16 is a circuit diagram showing an entire configuration of a waiting power supply portion according to the third embodiment.

In FIG. 16 where the portions corresponding with those in FIG. 2 are given the same reference numerals and characters, the operation state of the waiting power supply portion 70 (excitation circuit portion 52 and control circuit portion 62) disposed inside the television set 100 in a waiting state will be described in detail.

When an AC plug 81 is inserted into the commercial power supply 80 (in FIG. 14), the excitation circuit portion 52 halfwave-rectifies with the rectifying diodes D1 and D2 the commercial voltage supplied via the commercial power supply 80 and the AC plug 81 sequentially to charge the switching voltage accumulating capacitor C12 from the side of the connection point 15.

At this time, the excitation circuit portion 52 supplies the changed portion of the charged voltage generated by charging the switching voltage accumulating capacitor C12 with a differential circuit configured by the capacitor C11 and the resistor R19 to the gates of the FETs 5 and 6 via the reverse flow preventing diode D9 and the resistor R25 sequentially to cause the FETs 5 and 6 to turn on.

Thereby, the excitation circuit portion 52 supplies the primary coil 3 of the power supply transformer Tr with the;. alternating current supplied via the AC plug 81 and brings the power supply transformer Tr into the initial excitation operation.

Incidentally, the excitation circuit portion 52 selects a time constant including of the differential circuit (the capacitor C11 and the resistor R19) so that in no case any changes in the charged voltage generated by charging the switching voltage accumulating capacitor C12 prior to accumulating the electric charges equivalent to the capacitance of the secondary side voltage accumulating capacitor C4 due to initial excitation operation of the power supply transformer Tr might disappear.

In addition, the reverse flow preventing diode D9 is for proceeding with separation so that a rise in the emitter voltage due to the turn on of the transistor 13 inside the photocoupler PH will not make the differential circuit (the capacitor C11 and the resistor R19) a load at the time of the normal excitation operation.

Moreover, the excitation circuit portion 52 is arranged to avoid the spike voltage which takes place in the case where the FETs 5 and 6 are turned off rapidly with the time constant of the capacitor C13 and the resistor R25.

Moreover, in the excitation circuit portion 52, it is arranged that the voltages between the gates and the drains of the FETs 5 and 6 will not rise too much with the voltage controlling diode D10 to control the charging of the switching voltage accumulating capacitor C12 with the resistor R2 and in the case where the AC plug 81 no longer has the commercial voltage, the electric charges charged in the switching voltage accumulating capacitor C12 are swiftly discharged.

When the power supply transformer Tr is brought into the initial excitation operation by the excitation circuit portion 52, it supplies the control circuit portion 62 with the commercial voltage supplied to the primary coil 3 via the secondary coil 4.

The control circuit portion 62 rectifies the commercial voltage supplied from the secondary coil 4 of the power supply transformer Tr with the rectifying diode D4, and supplies the rectified direct current voltage into the secondary side voltage accumulating capacitor C4, the relay driving capacitor C8 and the waiting voltage accumulating capacitor C9.

At this time, the inner voltage adjusting IC 17 operates when the charged voltage having taken place by charging the secondary side voltage accumulating capacitor C4 has reached a predetermined value, and thereby the output end 17b is arranged to always provide a constant voltage.

This serves to cause the inner voltage adjusting IC 17 to also charge the waiting voltage accumulating capacitor C10 with a predetermined value of direct currents via the output end 17b of the inner voltage adjusting IC 17.

In this state, to the base voltage of the transistor 10, the voltage portion derived from voltage division with the voltage dividing resistors R15, R16, and R17 on the charged voltage taking place by charging the secondary side voltage accumulating capacitor C4 has been applied, and the emitter voltage of the transistor 10 is made constant with the inner voltage adjusting IC 17 which has operated with the initial excitation operation of the power supply transistor Tr.

Accordingly, the transistor 10 turns on since the base voltage is less than the emitter voltage during the initial period when the secondary side voltage accumulating capacitor C4 is being charged.

In this case, the transistor 11 turns on since a voltage is generated between the base and emitter with the collector current of the transistor 10. At this time, the base voltage of the transistor 10 undergoes voltage division not with the voltage dividing resistors R15, R16 and R17 but with voltage dividing resistors R15 and R16 only, and therefore drops rapidly, and accompanied thereby, the on-operation of the transistor 10 is accelerated.

Accordingly, the transistor 10 supplies a large amount of current from the collector to the transistor 11 and accompanied herewith the transistor 11 supplies a large amount of current between the collector-emitter, and to the ground via the output end 8.

Thus, the control circuit portion 62 maintains the mutual turn on with the excitation operation starting feedforward in accordance with the on-operation of the transistor 10 and the turn on of the transistor 11.

At this time, the base of the transistor 12 is connected with the collector side of the transistor 10, and thus as in the transistor 11, generates a voltage between the base and the emitter to sustain the on-operation.

Accordingly, the photocoupler PH is supplied with a current from the output end 17b of the inner voltage adjusting IC 17 via the resistor R13 and is operated.

Here, as for the transistor 10, corresponding with a rise of the charged voltage taking place due to continuous charge on the secondary side voltage accumulating capacitor C4, the base voltage rises, and when the charged voltage exceeds a first threshold value, starts turn off so as gradually stop providing the currents which are flowing between the emitter and the collector.

Thereby, the transistor 11 will be gradually supplied with less voltage that used to take place between the base and the emitter and will turn off in due course. Accordingly the base voltage of the transistor 10 undergoes voltage division not with the voltage dividing resistors 15 and R16 but with voltage dividing resistors R15, R16, and R17 in which the voltage dividing resistor R17 is additional, and therefore rises rapidly, and accompanied thereby, the turn off of the transistor 10 is accelerated.

The transistor 10 turns off since the voltage having taken place between the base and the emitter will no longer be supplied completely, and accompanied herewith the transistor 12 likewise turns off since the voltage having taken place between the base and the emitter will no longer be supplied completely.

This serves to cause the photocoupler PH to halt its operation so that the transistor 13 inside the photocoupler PH turns off.

In this case, since the transistor 13 inside the photocoupler PH turns off, the excitation circuit portion 52 does not supply the gates of the FETs 5 and 6 with the charged voltage into the switching voltage accumulating capacitor C12, and thereby causes the FETs 5 and-6 to turn off.

Accordingly, the excitation circuit portion 52 does not supply the primary coil 3 of the power supply transformer Tr with the commercial voltage from the plug 81, and thereby halts the initial excitation operation of the power supply transformer Tr.

At this time, in the excitation circuit portion 52, the electric charges left in the FETs 5 and 6 and the electric charges left in the capacitor C13 are arranged to be discharged by the resistors R25 and R26.

In this case, in the control circuit portion 62, the charged voltage generated by charging the relay driving capacitor C8 and the waiting voltage accumulating capacitors C9 and C10 are supplied to the decoding portion 76 as the waiting voltage V1 (in FIG. 14) via the output ends 7 and 22.

Thus, in the control circuit portion 62, after the inner voltage adjusting IC 17 operates, in the case where the voltage of the secondary side voltage accumulating capacitor C4 exceeds the first threshold value, the excitation operation halting feedforward causes the transistor 12 to turn off so that the photocoupler PH of the excitation circuit portion 52 is operated to halt the excitation operation (the initial excitation operation) of the power supply transformer Tr.

Here, in the control circuit portion 62, until the electrical charges charged on the secondary side voltage accumulating capacitor C4 are discharged and the time constants on the secondary side voltage accumulating capacitor C4 and the voltage dividing resistors R15, R16 and R17 are selected so that the discharge period until the voltage of the secondary side voltage accumulating capacitor C4 falls under the second threshold value will be sufficiently long (for example around 3200 seconds).

At this time, in control circuit portion 62, ignoring the leak currents of the secondary side voltage accumulating capacitor C4, the relay driving capacitor C8, and the waiting voltage accumulating capacitors C9 and C10, the electric charges charged on the secondary side voltage accumulating capacitor C4 are caused to flow in only the inner voltage adjusting IC 17 and the voltage dividing resistors R14, R15 and R17, and therefore when no load currents exist, the total currents of the control circuit portion 62 will be the currents flowing only in the inner voltage adjusting IC 17 and the voltage dividing resistors R14, R15 and R17.

In addition, the control circuit portion 62 discharges the electrical charges charged on the secondary side voltage accumulating capacitor C4 gradually, resulting in the charged voltage of the secondary side voltage accumulating capacitor C4 falls under the second threshold value, and turns the transistor 12 on with excitation operation recovering feedforward so as to operate the photocoupler PH of the excitation circuit portion 52.

In this case, in the excitation circuit portion 52, since the transistor 13 inside the photocoupler PH is turned on, the charged voltage of the switching voltage accumulating capacitor C12 is supplied to the gates of the FETs 5 and 6 so that the FETs 5 and 6 turn on.

Accordingly, the excitation circuit portion 52 supplies the commercial voltage from the AC plug 81 to the primary coil 3 of the power supply transformer Tr, and thereby brings the power supply transformer Tr into the normal excitation operation.

At this time, the control circuit portion 62 rectifies the commercial voltage supplied from the secondary coil 4 of the power supply transformer Tr with the rectifying diode D4, and supplies the rectified direct voltage into the secondary side voltage accumulating capacitor C4, the relay driving capacitor C8, the waiting voltage accumulating capacitors C9 and C10 respectively.

Thus, it is arranged that the control circuit portion 62 executes operation control on the photocoupler PH of the excitation circuit portion 52 intermittently corresponding with the charged voltage value of the secondary side voltage accumulating capacitor C4 by means of the transistor 12 turns on and off linked with the feedforward for excitation operation start or the feedforward for excitation operation halt of the transistor 10 and the transistor 11 of the voltage detecting portion 48 so as to always secure a predetermined level of the charged voltage generated by charging the relay driving capacitor C8, the waiting voltage accumulating capacitors C9 and C10, and can always supply this to the decoding portion 76 as the waiting voltage V1.

Next, based on the results subject to calculative comparison on difference in the consumed power of the respective waiting power supply portions 70 between the consumed power of the waiting power supply portions 70 (in FIG. 16) configured by such excitation circuit portion 52 and control circuit portion 62 and the consumed power of the waiting power supply portions 70 (in FIG. 15) configured by the excitation circuit portion 51 and the control circuit portion 61 according to the above described second embodiment will be verified.

At first, it is assumed that the output from the output ends 7 and 22 of the control circuit portions 61 and 62 is 0 and in respective elements of the excitation circuit portion 52 and the control circuit portion 62 and of the excitation circuit portion 51 and the control circuit portion 61, the capacity of the secondary side voltage accumulating capacitor C4 is 4700~,F, the first threshold voltage value (the upper limit voltage value) of the inner voltage adjusting IC 17 in the capacitance of the secondary side voltage accumulating capacitor C4 is 7.63V, the second threshold voltage value (the lower limit voltage value) of the inner voltage adjusting IC 17 in the capacitance of the secondary side voltage accumulating capacitor C4 is 6.10V, the inner consumed current of the inner voltage adjusting IC 17 is 1.2 $\mu$A, the charging efficiency of the secondary side voltage accumulating capacitor C4 is 50%, the capacitance of the capacitors C1 and C2 is 470 pF, the value of the resistor R1 is 100 k$\Omega$, the value of the discharging resistant R2 is 4.7 M$\Omega$, and the value of the voltage limiting diode D3 is 15V.

Subsequently, in the excitation circuit portion 52 and the control circuit portion 62, it is assumed that the current flowing in the photocoupler PH at the time when the excitation operation of the power supply transformer Tr halts is 0 $\mu$A, the current flowing in the voltage detecting portion 48 at the time when the excitation operation of the power supply transformer Tr halts is 1 $\mu$A, the current flowing in the photocoupler PH at the time when the power supply transformer Tr executes the excitation operation is 123 $\mu$A, the current flowing in the voltage detecting portion 48 at the time when the power supply transformer Tr executes the excitation operation is 6 $\mu$A and the excitation operation time of the power supply transformer Tr is 0.05 s, and in the excitation circuit portion 51 and the control circuit portion 61, it is assumed that the current flowing in the photocoupler PH at the time when the excitation operation of the power supply transformer Tr halts is 123 $\mu$A, the current flowing in the voltage detecting portion 48 at the time when the excitation operation of the power supply transformer Tr halts is 6 $\mu$A, the current flowing in the photocoupler PH at the time when the power supply transformer Tr executes the excitation operation is 0 $\mu$A, the current flowing in the voltage detecting portion 48 at the time when the excitation operation of the power supply transformer Tr halts is 14 μA, and the excitation operation time of the power supply transformer Tr is 0.05 s.

Figure 15:
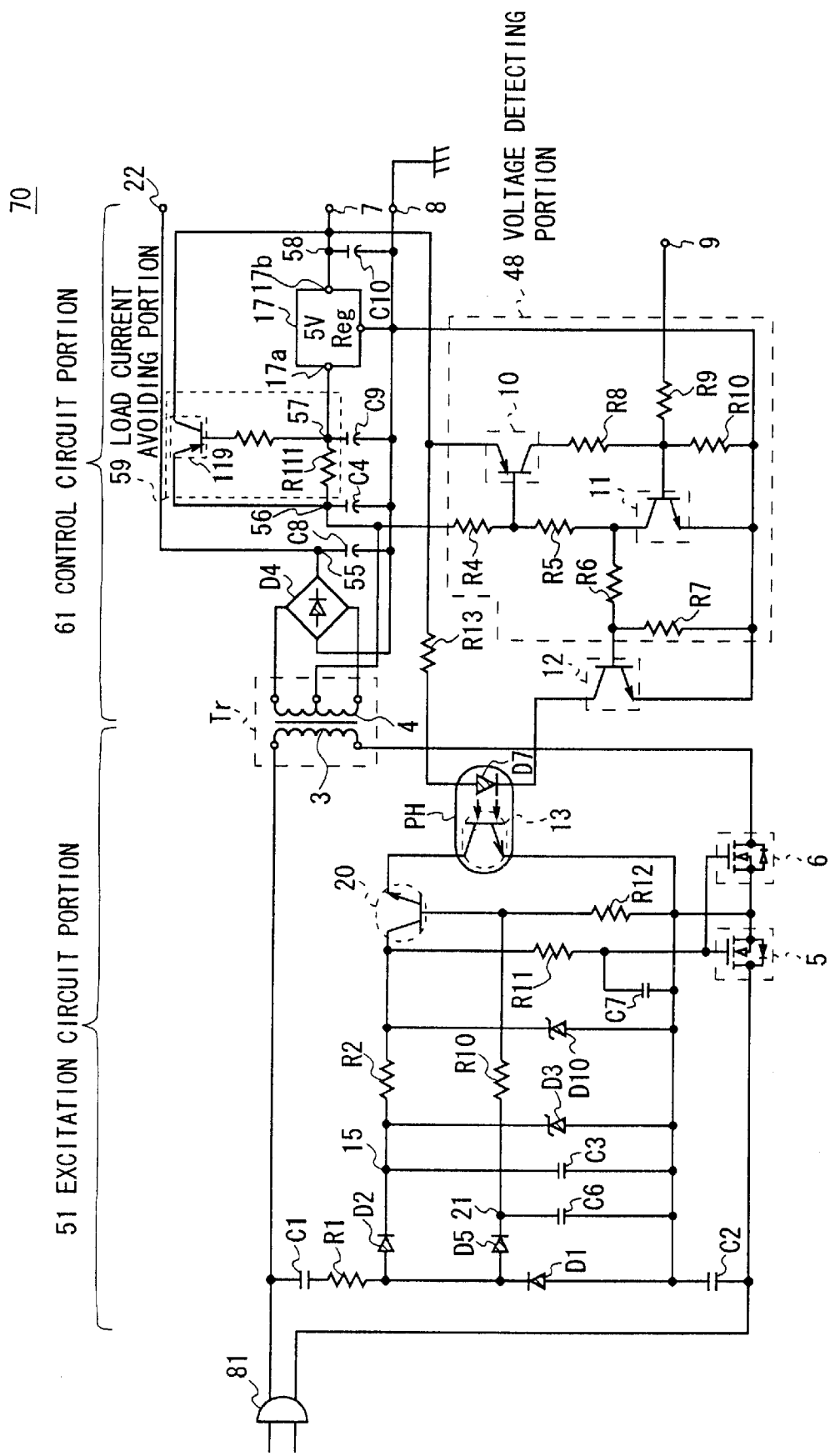
FIG. 15 is a circuit diagram showing an entire configuration of a waiting power supply portion according to a second embodiment.

The excitation operation halting time (T: time) of the power supply transformer Tr in case of assumption as described above is calculated, resulting in 55.3 s in the waiting power supply portion 70 (the excitation circuit portion 51 and the control circuit portion 61) in FIG. 15 and 3268 s in the waiting power supply portion 70 (the excitation circuit portion 52 and the control circuit portion 62) in FIG. 16 with CV=IT (C: capacitor capacitance, V: voltage balance, I: current, and T: time).

In this case, the consumed power for the excitation circuit portion 52 to cause the FETs 5 and 6 to turn on is the total of the consumed power of the resistor R1 (approximately 0.004 mW), the consumed power of the capacitors C1 and C2 (approximately 0.006 mW), and the consumed power of the voltage limiting diode D3 and the charging/discharging resistor R2 (approximately 0.045 mW), and is approximately 0.055 mW.

In addition, in the charging consumed power by the control circuit portion 62 on the secondary side voltage accumulating capacitor C4 (charging consumed power of the secondary side voltage accumulating capacitor C4 for one cycle of charging and discharging), difference between the secondary side voltage accumulating capacitor C4 energy when the capacitance of the secondary side voltage accumulating capacitor C4 has a voltage of 7.63V being the first threshold value of the voltage value (the upper limit voltage value) in the inner voltage adjusting IC 17 (that is, $CV^2/2=136.8$ mJ) and the secondary side voltage accumulating capacitor C4 energy when the capacitance of the secondary side voltage accumulating capacitor C4 has a voltage of 6.10V being the second threshold voltage value (the lower limit voltage value) in the inner voltage adjusting IC 17 (that is, $CV^2/2=87.4$ mJ) is 49.4 mJ, or will be 98.8 mJ (that is, 49.4 mJ×2) due to the charging efficiency of the secondary side voltage accumulating capacitor C4 being 50%, and due to the time lapsing for the voltage value of the secondary side voltage accumulating capacitor C4 shifts from 7.63V to 6.10V (the excitation operation halting time of the power supply transformer Tr) being 3268 seconds, will be 0.030 mW (that is, the charged energy of the secondary side voltage accumulating capacitor C4/the excitation operation halting time of the power supply transformer Tr=98.8 mJ/3268 seconds).

Thereby, the consumed power of the excitation circuit portion 52 and the control circuit portion 62 in the waiting power supply portion 70 (that is, consumed power from the commercial voltage 80) is 0.085 mW (that is, 0.055 mW+0.030 mW).

In contrast, the consumed power for the excitation circuit portion 51 to cause the FETs 5 and 6 to turn on is similar to that in the excitation circuit portion 52, or 0.055 mW.

In addition, as for the charging consumed power of the control circuit portion 61 on the secondary side voltage accumulating capacitor C4, the energy necessary for charging the secondary side voltage accumulating capacitor C4 will be similar to that for the control circuit portion 62, or 98.8 mJ and will be 1.79 mW due to the excitation operation halting time of the power supply transformer Tr being 55.3 s (that is, the charging energy of the capacitor C12/the excitation operation halting time of the power supply transformer Tr=98.8 mJ/52 seconds).

Thereby, the consumed power of the excitation circuit portion 51 and the control circuit portion 61 in the waiting power supply portion 70 (that is, the consumed power from the commercial voltage 80) is 1.845 mW (that is, 0.055 mW+1.79 mW).

According to the above described calculation, the consumed power of the excitation circuit portion 52 and the control circuit portion 62 will become approximately ½₀ of the consumed power of the excitation circuit portion 51 and the control circuit portion 61 by comparison. Thus, compared with the control circuit portion 61 in the above described second embodiment, the control circuit portion 62 is featured by a largely extended excitation operation halting time of the power supply transformer Tr (from 55.3 s to 3268 s) and by no load current from the control circuit portion 62 (the inner voltage adjusting IC 17) to the photocoupler PH in the excitation operation halting time of the power supply transformer Tr (from 123 p.A to OVA so that the consumed power can be reduced further.

In addition, the consumed power of the excitation circuit portion 52 and the control circuit portion 62 is only around 0.74 wh even in the case where the waiting power supply portion 70 operates for a year. Accordingly, a user who uses the television set 100 having the waiting power supply portion 70 configured by the excitation circuit portion 52 and the control circuit portion 62 can reduce the billed charge for consuming electricity to use the television set 100.

Incidentally, the above described calculated amounts are based on assumption that the output from the output ends 7 and 22 of the control circuit portions 61 (in FIG. 15) and 62 (in FIG. 16) of the respective waiting power supply portions 70 in FIG. 15 and FIG. 16 is 0, and therefore, actual the consumed power of circuits in operation then will be summed up. However, the quantity to be added in the above described excitation circuit portion 52 and the control circuit portion 62 is equal to that in the excitation circuit portion 51 and the control circuit portion 61 and the balance will be as calculated above.

Figure 17:
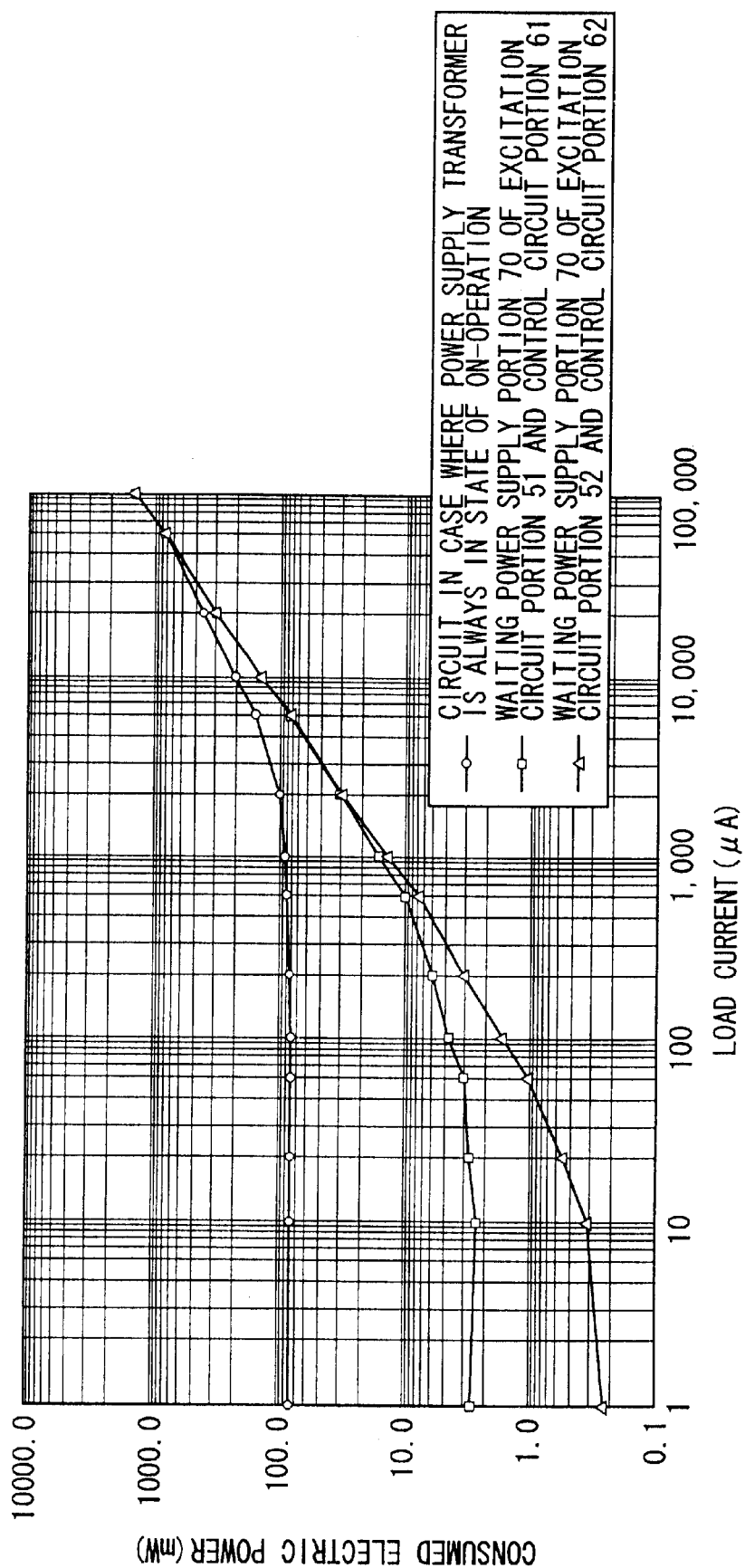
FIG. 17 is a characteristic curve graph showing circuit characteristics.

Next, FIG. 17 is a graph showing an example of surveillance of each circuit characteristics of the excitation circuit portion 52 and the control circuit portion 62 as well as the excitation circuit portion 51 and the control circuit portion 61 both according to the above described second embodiment and the circuit in the case where the power supply transformer Tr is always in the excitation operation state.

In FIG. 17, the consumed power in the respective waiting power supply portions 70 (in FIG. 15 and in FIG. 16) taken from the side of the commercial voltage 80 at the time when respective values of the load currents were, applied to the currents output from the output ends 7 and 22 of the control circuit portion 62 and the control circuit portion 61 and the consumed power taken from the side of commercial voltage 80 at the time when respective values of the load currents were applied to the circuit in the case where the power supply transformer Tr is always in the excitation operation state were checked and the compared results were presented as a graph with the vertical axis for the consumed power [mW] taken from the side of the commercial voltage 80 and with the horizontal axis for the load current [μA].

As should be apparent from FIG. 17, in the excitation circuit portion 52 and the control circuit portion 62 as well as the excitation circuit portion 51 and the control circuit portion 61 according to the above described second embodiment, the lower the load current will be, the lower the consumed power will be.

Accordingly, in the excitation circuit portion 52 and the control circuit portion 62 as well as the excitation circuit portion 51 and the control circuit portion 61 according to the above described second embodiment, it can be seen that the lower the load current will be, the further the consumed power will be reduced.

Figure 18:
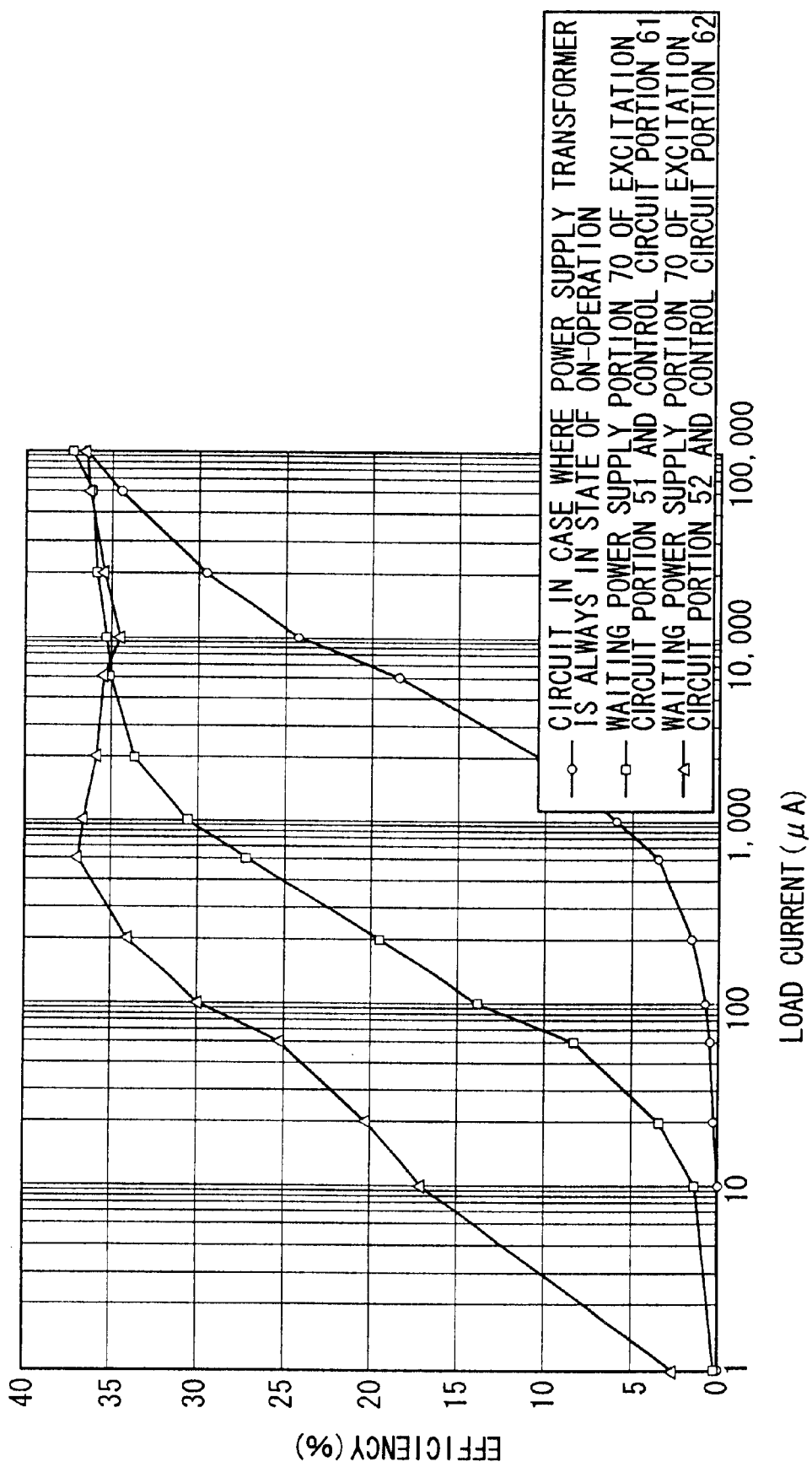
FIG. 18 is a characteristic curve graph showing power supply efficiency.

In addition, FIG. 18 is a graph showing the calculation of surveillance of the power supply efficiencies of the excitation circuit portion 52 and the control circuit portion 62 as well as the excitation circuit portion 51 and the control circuit portion 61 according to the above described second embodiment and the circuit in the case where the power supply transformer Tr is always in the excitation operation state.

In FIG. 18, the power supply efficiency in the respective waiting power supply portions 70 (in FIG. 15 and in FIG. 16; at the time when respective values of the load currents were. applied to the currents outputted from the output ends 7 and 22 of the control circuit portion 62 and the control circuit portion 61 and the power supply efficiency at the time when respective values of the load currents were applied to the circuit in the case where the power supply transformer Tr is always in the excitation operation state were checked and the compare[0084] results were presented as a graph with the vertical axis for the power supply efficiency [%] and with the horizontal axis for the load current [μA].

As apparent from FIG. 18, in the excitation circuit portion 52 and the control circuit portion 62 as well as the excitation circuit portion 51 and the control circuit portion 61 according to the above described second embodiment, the drop in the power supply efficiency is little also with the time of the low load current.

Accordingly, in the excitation circuit portion 52 and the control circuit portion 62 as well as the excitation circuit portion 51 and the control circuit portion 61 according to the above described second embodiment, it can be seen that the lower the load current will be, the further the difference in the power supply efficiency will be improved, compared with the circuit in the case where the power supply transformer Tr is always in the excitation operation state.

Incidentally, in the excitation circuit portion 52 and the control circuit portion 62, the lower the load current will be, the more remarkable the intensity of the power supply efficiency will be, compared with the respective kinds of power supply apparatuses which improve the power supply efficiency by intermittent operations.

Thus, in the excitation circuit portion 52 and the control circuit portion 62 as well as the excitation circuit portion 51 and the control circuit portion 61 according to the above described second embodiment, energy saving can be planned efficiently in the television set 100.

In the configuration described so far, it was arranged that in the control circuit portion 62 the base of the transistor 12 is brought into connection with the connection end of the collector of the transistor 10 so as to cause the transistor 12 to turn off linked with the excitation operation halting feedforward, and in the case of causing the photocoupler PH to halt its operation, the excitation circuit portion 52 causes the FETs 5 and 6 to turn off to halt the excitation operation of the power supply transformer Tr.

Accordingly, in the excitation circuit portion 62, at the time when the excitation operation of the power supply transformer Tr is halted, since the transistor 12 is turned off, the load current to the photocoupler PH is cut off.

In this case, in the excitation circuit portion 62, the routes to discharge the currents charged on the secondary side voltage accumulating capacitor C4 are only the inner voltage adjusting IC 17, and resistors R15, R16 and R17 as a constant voltage circuit.

Moreover, the control circuit portion 62, in which the discharge time constants on the secondary side voltage accumulating capacitor C4 and the voltage dividing resistors R14, R15 and R17 are selected to be large, can operate with a little load current at the time when the excitation operation of the power supply transformer Tr is halted.

On the contrary hereto, the control circuit portion 62 causes the load current to flow in the photocoupler PH in the case where the power supply transformer Tr is on the excitation operation, but the direct current voltage rectified based on the commercial voltage supplied directly from the commercial power supply 80 is charged to the secondary side voltage accumulating capacitor C4 that, therefore, can be executed for a short time, and thereby the excitation operation can be halted immediately.

Thus, in the excitation circuit portion 62, the time when the excitation operation of the power supply transformer Tr is halted is set long, and at this time, the discharge currents from the secondary side voltage accumulating capacitor C4 are transmitted a specific routes (the route of the inner voltage adjusting IC 17, and resistors R15, R16 and R17) only, so that energy saving can be planned further efficiently.

In such a control circuit portion 62, as apparent from the calculative verification as well as respective graphs (in FIG. 17 and FIG. 18) on surveillance, compared with the above described second embodiment, energy saving can be planned further efficiently.

According to the configuration described so far, in the excitation circuit portion 62, the time when the excitation operation of the power supply transformer Tr by the excitation circuit portion 52 is halted was arranged to be made long, and the electric currents supplied to the photocoupler PH were arranged to be cut off in the case where the excitation operation is halted, so that as the entire waiting power supply portion 70 or as the entire television set 100 energy saving can be planned further efficiently.

Figure 19:
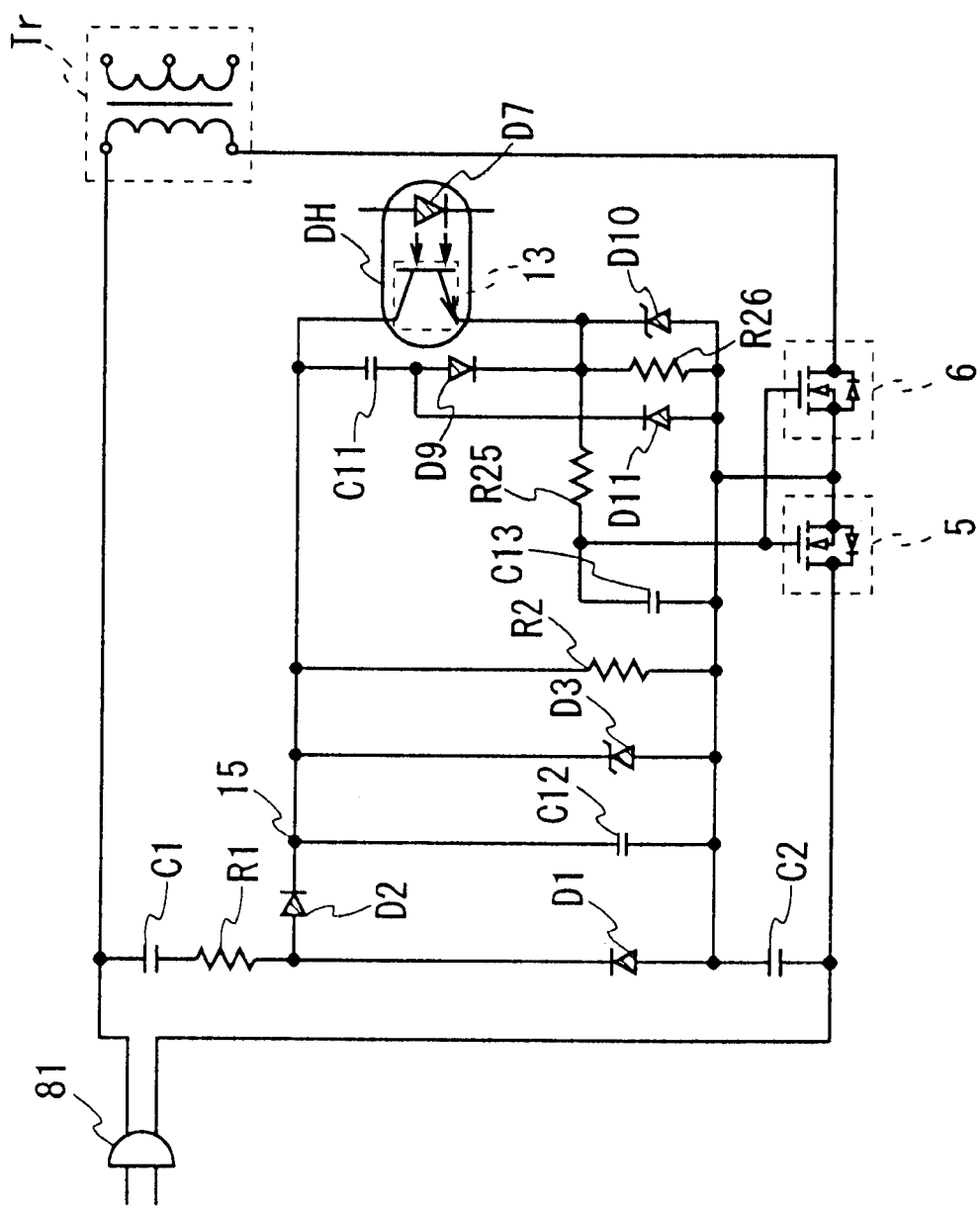
FIGS. 19 and 20 are circuit diagrams showing configurations of excitation circuit portions according to other embodiments.

Incidentally, in the above described third embodiment, the case where in the direct current voltage generating circuit comprising the capacitor C1, the capacitor C2, the resistor R1, the resistor R2, the rectifying diode D1, the rectifying diode D2, the voltage limiting diode D3, the switching voltage accumulating capacitor C12, the capacitor C11, the resistor R19, and the reverse flow preventing diode D9, with the capacitor C11 as well as the resistor R19 (differential circuit) and the reverse flow preventing diode D9 brought into connection in series with the capacitor C11, a direct current voltage is supplied to the FETs 5 and 6 when the commercial power supply 80 starts supplying was described, but the present invention is not limited hereto and in FIG. 19 where the portions corresponding with those in FIG. 16 are given the same reference numerals and characters, the diode D11 may be arranged to be used instead of the resistor R19.

In this case, since the discharge time constant for discharging the remaining electric charges when the commercial power supply 80 is switched off becomes small, the excitation circuit portion 52 can discharge the electric charges swiftly.

Figure 20:
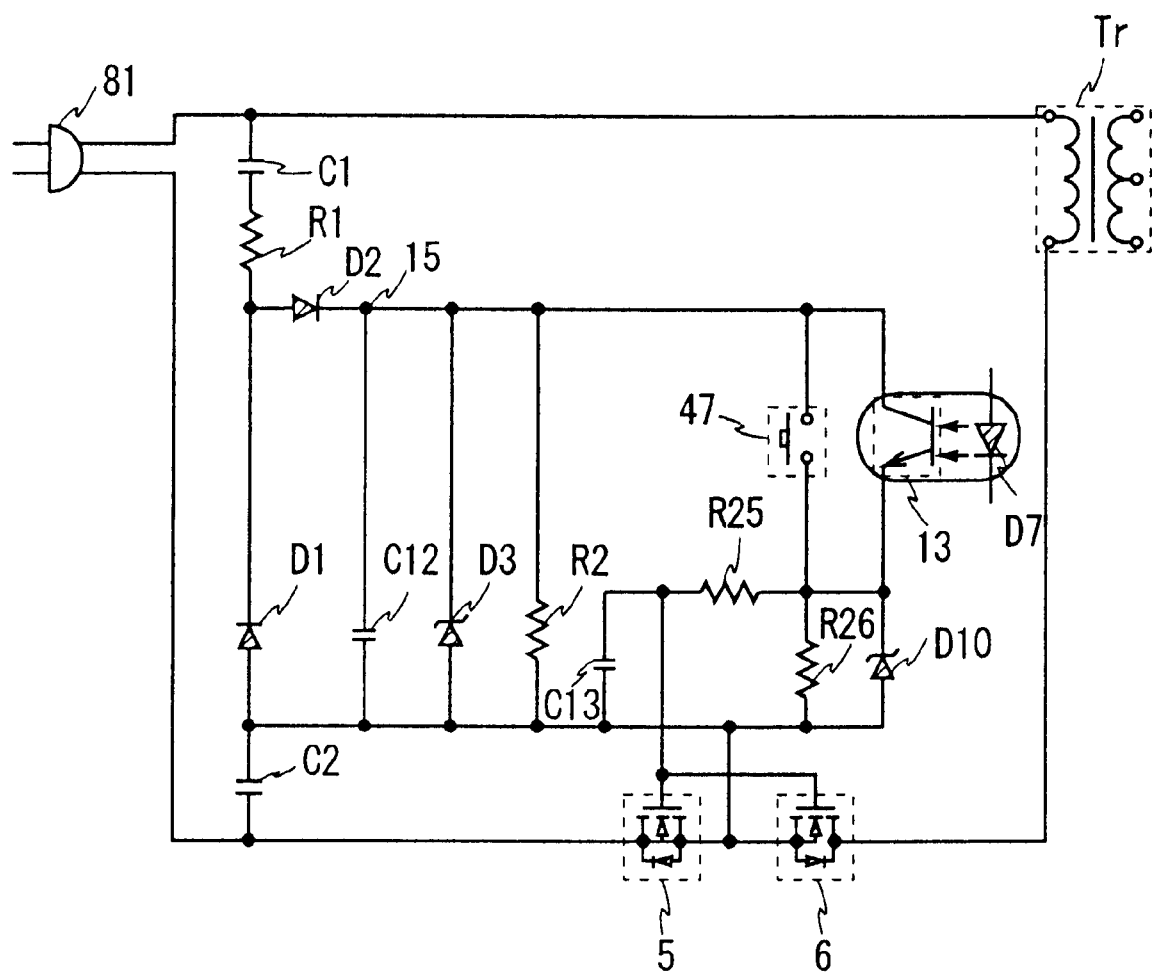

In addition, in the above described third embodiment, out of the capacitor C1, the capacitor C2, the resistor R1, the resistor R2, the rectifying diode D1, the rectifying diode D2, the voltage limiting diode D3, the switching voltage accumulating capacitor C12, the capacitor C11, the resistant R19, and the reverse flow preventing diode D9 as direct current voltage generating circuit, the case that by means of the capacitor C11 as well as the resistor R19 (differential circuit) and the reverse flow preventing diode D9 brought into connection in series with the capacitor C11, a direct current voltage is supplied to the FETs 5 and 6 when the commercial power supply 80 starts supplying was already described, but the present invention is not limited hereto and in FIG. 20 where the portions corresponding with those in FIG. 16 are given the same reference numerals and characters, the momentary switch 47 which causes the FETs 5 and 6 to execute the on-operation only when it continues to be pushed down may be arranged to be used instead of the capacitor C11, the resistor R19, and the reverse flow preventing diode D9.

In this case, circuit elements for the excitation circuit portion 52 can be reduced so that the excitation circuit portion 52 can be simplified.

Moreover, in the above described third embodiment, the case where only when the commercial power supply 80 starts supplying, the excitation circuit portion 52 causes the FETs 5 and 6 to execute the on-operation to cause the power supply transformer Tr to execute the initial excitation operation was described, but the present invention is not limited hereto and also when the control circuit portion 62 halts its operation when, for example, the power supply is cut off, the FETs 5 and 6 may be caused to execute the on-operation to cause the power supply transformer Tr to execute the initial excitation operation.

Figure 21:
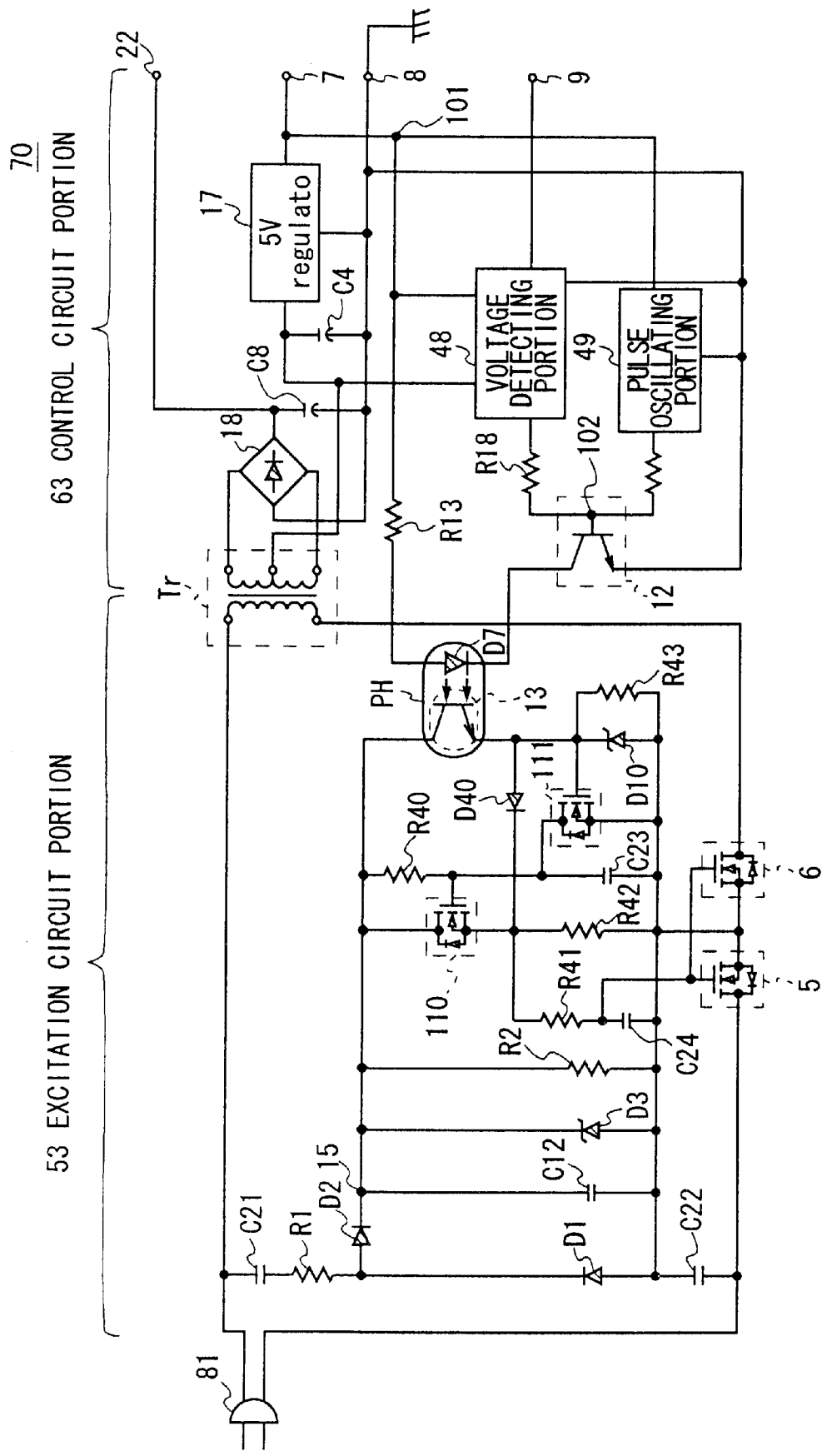
FIG. 21 is a circuit diagram showing a configuration of a waiting power supply portion according to another embodiment.

In this case, as in FIG. 21 where the portions corresponding with those in FIG. 16 are given the same reference numerals and characters, in the waiting power supply portion 70, apart from the control by the control circuit portion 63 to operate or halt operation on the photocoupler PH, the pulse oscillating portion 49 controls to operate or halt operation of the photocoupler PH as well.

The excitation circuit portion 53 will not cause the FETs 5 and 6 to turns on in correspondence with the control of the pulse oscillating portion 49 to operate or halt operation of the photocoupler PH, but when the control circuit portion 62 halt its operation for example owing to power failure or the like and thus the pulse oscillating portion 49 no longer controls the photocoupler PH to operate or halt operation, the excitation circuit portion 53 causes the FETs 5 and 6 to turn on to cause the power supply transformer Tr to execute the initial excitation operation.

Figure 22:
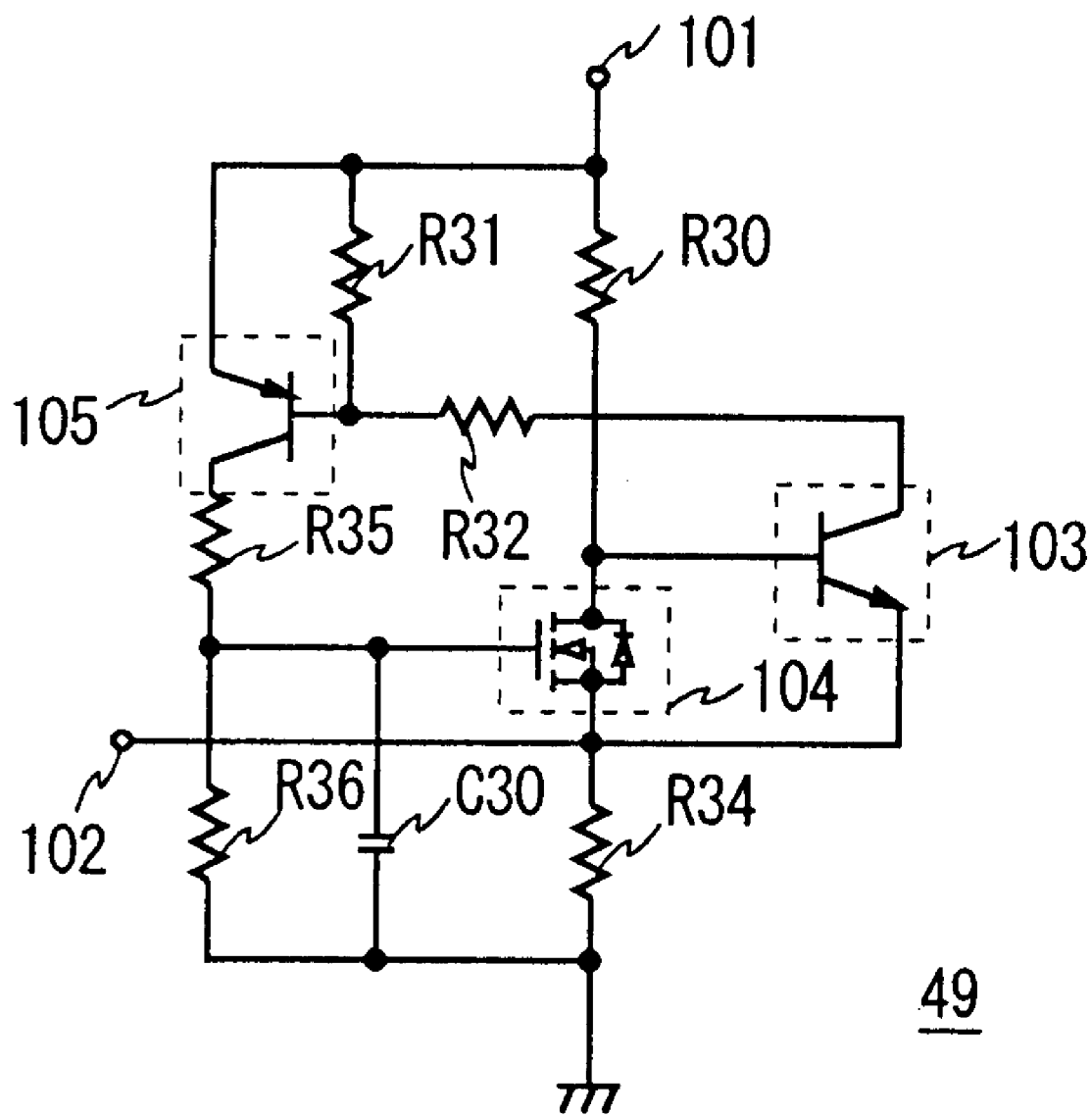
FIG. 22 is a circuit diagram showing a configuration of a pulse oscillating portion. .

This pulse oscillating portion 49 is, as shown in FIG. 22, a circuit utilizing charge/discharge of the secondary side voltage accumulating capacitor C30, and when the transistor 105 is caused to execute the on-operation due to feedforward in accordance with the on-operation of the transistor 103 and the turn off of the FET 104, charges the currents supplied from the inner voltage adjusting IC 17 via the input end 101 to the voltage change detecting capacitor C30 via the resistor R35, and supplies them to the base of the transistor 12 (in FIG. 21) via the output end 102.

That is, when the charged voltage of the voltage change detecting capacitor C30 rises, the gate voltage of the FET 104 rises and the FET 104 starts executing the on-operation. When the FET 104 turns on, the feedforward operation with the transistor 103 causes the FET 104 and the transistors 103 and 105 reverse the on-and-off operation in an instant to-halt the charging operation of the voltage change detecting capacitor C30, and at this time, the electric charges accumulated in the voltage change detecting capacitor C30 are discharged by the resistant R36:

In this case, it is arranged that the waveform from the output end 102 of the pulse oscillating portion 49 is selected so that the time of the output Hi is determined by the time constant of the voltage change detecting capacitor C30 and the resistant R35 while the output Lo by the time constant of the voltage change detecting capacitor C30 and the resistant R36.

This pulse oscillating portion 49 is arranged to operate with a lower electric power around 1.4 $\mu$A, and a large discharging time constant and a small charging time constant are selected so as to be capable of supplying the base of the transistor 12 with the current supplied from the inner voltage adjusting IC 17 via the input end 101 as a pulse of around 1 msec for once in one second.

Actually, when the AC plug 81 is inserted into the commercial power supply 80, the excitation circuit portion 53 half-wave-rectifies with the rectifying diodes D1 and D2 the commercial voltage supplied via the commercial power supply 80 and the AC plug 81 sequentially to charge the switching voltage accumulating capacitor C12 from the side of the connection point 15 and to give that charged voltage to the sub-switching voltage accumulating capacitor C23 via the resistant R40, and thereby raises the gate voltage of the FET 110.

Here, when the sub-switching voltage accumulating capacitor C23 exceeds a predetermined threshold value, the excitation circuit portion 53 causes the FET 110 to execute the on-operation, and thereby a voltage is applied to the gates of the FETs 5 and 6 to execute the on-operation, and accompanied hereby, causes the power supply transformer Tr to execute the initial excitation operation.

On the other hand, in the case where the photocoupler PH is operated and the transistor 13 is on the on-operation, the charged voltage taking place bY charging the voltage accumulating capacitor C12 is applied to the gate of the FET 111, and therefore the excitation circuit portion 53 causes the FET 111 to execute the on-operation so as to discharge the electric charges charged in the sub-switching voltage accumulating capacitor C23.

At this time, when the sub-switching voltage accumulating capacitor C23 is less than a predetermined threshold value, and accompanied hereby, the gate voltage of the FET 110 drops and therefore the excitation circuit portion 53 causes the FET 110 to execute the off-operation. Thereby, the excitation circuit portion 53 will no longer supply the gates of the FETs 5 and 6 with any voltage by the source of the FET 110, but since the transistor 13 inside the photocoupler PH is on the on-operation, a voltage is supplied to the gates of the FETs 5 and 6 from the emitter of the transistor 13 via the diode D40 and the resistant R41 sequentially so that the FETs 5 and 6 sustain the onoperation.

On the contrary hereto, in the control circuit portion 63, the voltage of the secondary side voltage accumulating capacitor C4 exceeds a predetermined voltage, the voltage detecting portion 48 causes the transistor 12 to execute the off-operation so that a current will no longer flow into the diode D7 inside the photocoupler PH and the transistor 13 inside the photocoupler PH will execute the off-operation. As a result thereof, the control circuit portion 53 causes the FETs 5 and 6 to execute the off-operation due to absence of the gate voltage and halts the initial excitation operation of the power supply transformer Tr.

Here, when the control circuit portion 63 is in the normal excitation operation state, the pulse oscillating portion 49 regularly controls the operation or halting operation of the photocoupler PH, and therefore, corresponding herewith the transistor 13 repeats the on-and-off operation regularly.

Accordingly, in the excitation circuit portion 53, since the on-and-off operation of the transistor 13 is accompanied by the repetitious on-and-off operation of the FET 111, it is arranged that the terminal voltage of the sub-switching voltage accumulating capacitor C23 is always held low.

In addition hereto, the excitation circuit portion 53 integrates the pulse-form voltage generated by the on-and-off operation of the transistor 13 with the resistant R41, the capacitors 24 and the gate capacitance of the FETs 5 and 6 and consequently influence to the on-and-off operation of the FETs 5 and 6 is arranged to be avoided.

Incidentally, the excitation circuit portion 53 is arranged to avoid the charged voltage generated by charging the sub-switching voltage accumulating capacitor C23 with the reverse flow preventing diode D40 to be applied as the gate voltage of the FET 111 via the FET 110.

With such an arrangement, in the excitation circuit portion 53, in the case where the pulse oscillating portion 49 no longer controls operation or halting operation of the photocoupler PH, the voltage of the sub-switching voltage accumulating capacitor C23 is not held low, and this serves to cause the FET 110 to execute the compulsory on-operation so that a voltage is applied the gates of the FETs 5 and 6 to execute the on-operation, and accompanied hereby the power supply transformer Tr is again caused to execute the initial excitation operation.

Accordingly, even in the case where the control circuit portion 63 stops its operation, the excitation circuit portion 53 can be revived automatically, and thus operation reliability of the waiting power supply portion 70 can be improved.

(4) Other Embodiments

In the above described embodiments, the case where the waiting power supply portion 70 as a power supply apparatus is provided inside the television set 100 as electric equipment was described, but the present invention is not limited hereto, and the power supply apparatus according to the present invention can be widely applied to electric equipment having, for example, a receiving apparatus (set top box) for bringing itself into connection with CATV (Cable Television) and/or the Internet or remote control using a remote controller of a video tape recorder, etc. or input operation by a sub-switch, or electric equipment such as a telephone and a personal computer, etc. having waiting functions other than a sub-switch, and moreover, electric equipment acquiring operation electric power by an AC adapter, or the like, or to the point, to other various kinds of electric equipment having electric switching circuit.

In addition, in the above described embodiment, the case where the commercial voltage is applied as the alternating current power supply was described, but the present invention is not limited hereto and other various kinds of alternating voltage, for example, the alternating voltage by private electric generation involving solar cell or the like, may be applied as the alternating current power supply.

As described so far, according to the present invention, energy saving can be planned further efficiently by having arranged to provide with a power supply transformer, and an excitation circuit, which is provided on a primary side of the power supply transformer, to excite the power supply transformer with a predetermined alternating current power supply, and a control circuit, which is provided in a second side of the power supply transformer, to start operation with the power supply transformer having entered an excited state and to intermittently operate the excitation circuit.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A power supply apparatus, comprising:
 a power supply transformer;
 an excitation circuit portion to be provided on a primary side of said power supply transformer and to excite said power supply transformer with an alternating current power supply; and
 a control circuit portion provided on a secondary side of said power supply transformer, to start an operation by said power supply transformer in an excitation state, and to cause said excitation circuit portion to operate intermittently;
 wherein said control circuit portion halts the excitation operation of said power supply transformer by said excitation circuit portion when the charged voltage value of a secondary side voltage accumulating capacitor charged by said power supply transformer in said excitation state exceeds a first threshold level; and after said power supply transformer halts the excitation operation, said control circuit portion resumes the excitation operation of said power supply transformer by said excitation circuit portion when a charged voltage value of said secondary side voltage accumulating capacitor drops due to a discharge to reach lower than a second threshold level.

2. A power supply apparatus, comprising:
 a power supply transformer;
 an excitation circuit portion to be provided on a primary side of said power supply transformer and to excite said power supply transformer with an alternating current power supply; said excitation circuit; and
 a control circuit portion provided on a secondary side of said power supply transformer, to start an operation by said power supply transformer in an excitation state, and to cause said excitation circuit portion to operate intermittently;
 said excitation circuit portion including:
  a switching element to switch supply of said alternating current power supply to said power supply transformer;
  a direct current voltage generating circuit to generate a direct current voltage for causing said switching element to operate, and supplying said switching element with said direct current voltage when supply of said alternating current voltage supply starts, said direct current voltage generating circuit including a switching accumulating capacitor to supply said switching element with a charged voltage of said switching voltage accumulating capacitor by said alternating current voltage supply; and
  a photocoupler to insulate said excitation circuit portion and said control circuit portion in between and to intermediate a control signal outputted from said control circuit portion to said switching element;
 wherein said control circuit portion resumes the excitation operation of said power supply transformer by said excitation circuit portion with said photocoupler of said excitation circuit portion to intermediate when a charged voltage value of said secondary side voltage accumulating capacitor drops due to a discharge to reach lower than a second threshold.

3. The power supply apparatus according to claim 2, wherein said control circuit portion controls a predetermined current to be supplied to said photocoupler in case of halting the excitation operation of said power supply transformer by said excitation circuit portion.

4. The power supply apparatus according to claim 3, wherein said control circuit portion is selected to have a large time constant including said secondary side voltage accumulating capacitor.

5. The power supply apparatus according to claim 4, wherein said photocoupler is in an ON condition, and said switching element supplies said alternating current power to said transformer.

6. The power supply apparatus according to claim 5, wherein said witching element is a field effect transistor to switch supply of said alternating current power supply.

7. The power supply apparatus according to claim 6, wherein a momentary switch is provided in parallel on an output end in order to make said switching element be in an ON state by hand operation.

8. The power supply apparatus according to claim 2 wherein said switching element includes a plurality of bridge diodes and a FET switch connecting them in a middle point.

9. The power supply apparatus according to claim 2 wherein said switching element includes a plurality of bridge diodes and a thyristor switch connecting them in a middle point.

10. The power supply apparatus according to claim 2 wherein said switching element includes a plurality of bridge diodes and an IGBT connecting them in a middle point.

11. The power supply apparatus according to claim 8, wherein said switching element includes two FET connected to each other in series, a limiting resistor connected in series with the two FET, and a triac iconnected in parallel with the two FET and the limiting resistor.

* * * * *